United States Patent

Hirai et al.

[11] Patent Number: 5,601,662
[45] Date of Patent: Feb. 11, 1997

[54] METHOD OF INTRODUCING MAGNETIC ANISOTROPY INTO MAGNETIC MATERIAL

[75] Inventors: Takahiro Hirai, Kamakura; Tadahiko Kobayashi; Masashi Sahashi, both of Yokohama, all of Japan

[73] Assignee: Kabushiki Kaisha Toshiba, Kawasaki, Japan

[21] Appl. No.: 545,628

[22] Filed: Jun. 29, 1990

[30] Foreign Application Priority Data

Jun. 30, 1989 [JP] Japan ................................. 1-169620
Nov. 17, 1989 [JP] Japan ................................. 1-298941

[51] Int. Cl.$^6$ ............................................. H01F 1/03
[52] U.S. Cl. ..................... 148/100; 148/103; 148/108; 148/565
[58] Field of Search ............................. 148/100, 103, 148/108, 565

[56] References Cited

U.S. PATENT DOCUMENTS 4,456,812  6/1984  Neiheisel et al. ................. 148/111

FOREIGN PATENT DOCUMENTS

| 0161593 | 11/1985 | European Pat. Off. |
| 56-26412 | 3/1981 | Japan. |
| 37127 | 3/1983 | Japan ................ 148/108 |
| 58-67005 | 4/1983 | Japan. |
| 211530 | 11/1984 | Japan. |
| 63-280476 | 11/1988 | Japan. |
| 1-1097100 | 4/1989 | Japan. |

Primary Examiner—Sikyin Ip
Attorney, Agent, or Firm—Oblon, Spivak, McClelland, Maier & Neustadt, P.C.

[57] ABSTRACT

There is disclosed a method of introducing magnetic anisotropy into a magnetic material, in which a laser beam is selectively radiated on the surface of a magnetic material to locally heat it, thereby forming a pattern of boundary phases for magnetically dividing a main phase of the magnetic material into a plurality of regions, and magnetic domains of the divided main phase regions are controlled to induce magnetic anisotropy in the main phase regions.

17 Claims, 19 Drawing Sheets

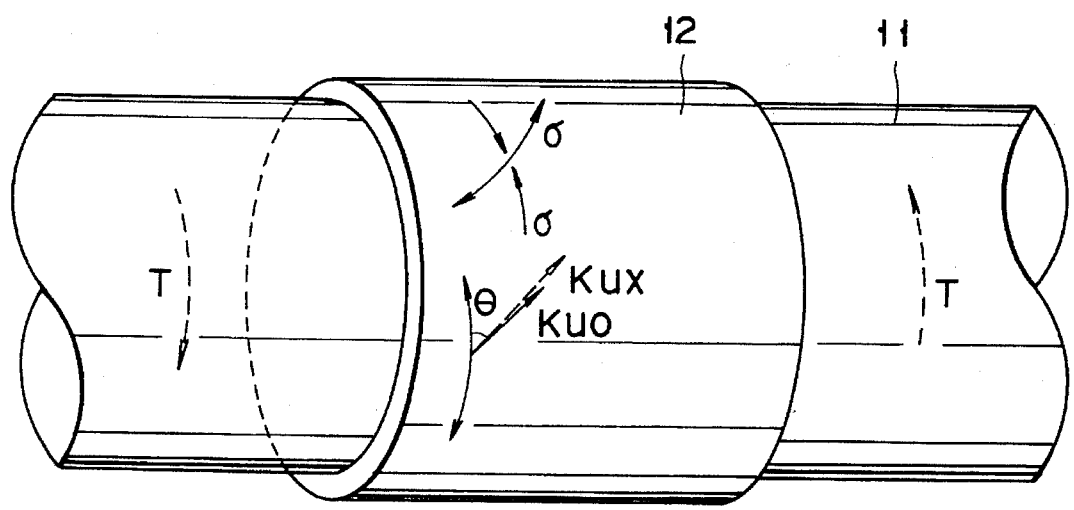
F I G. 1
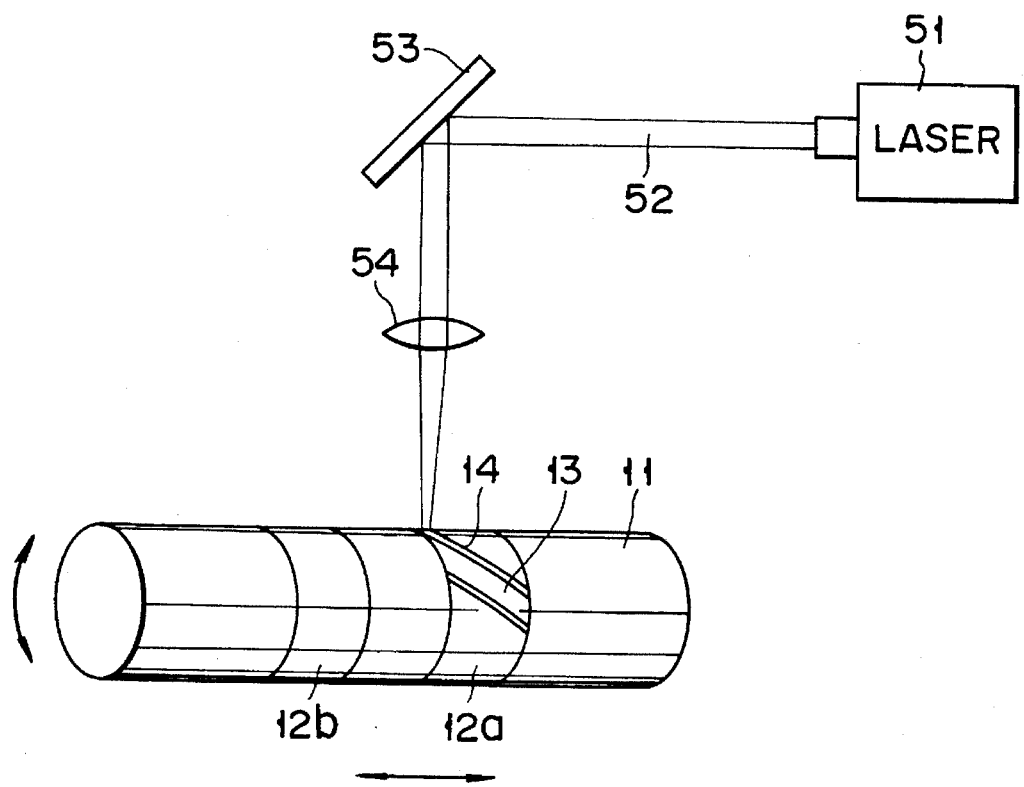
F I G. 2

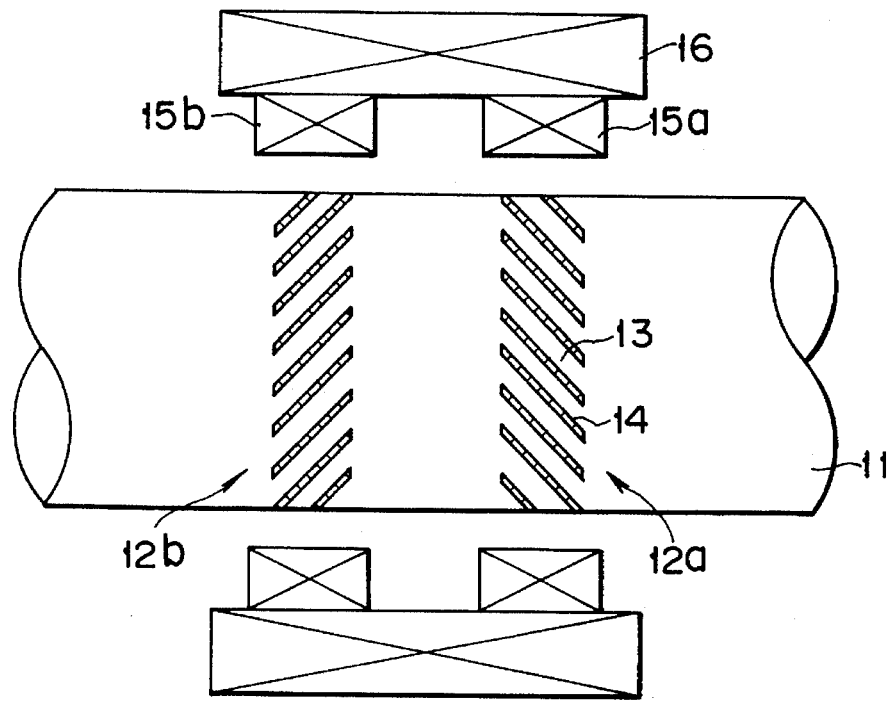
F I G. 12
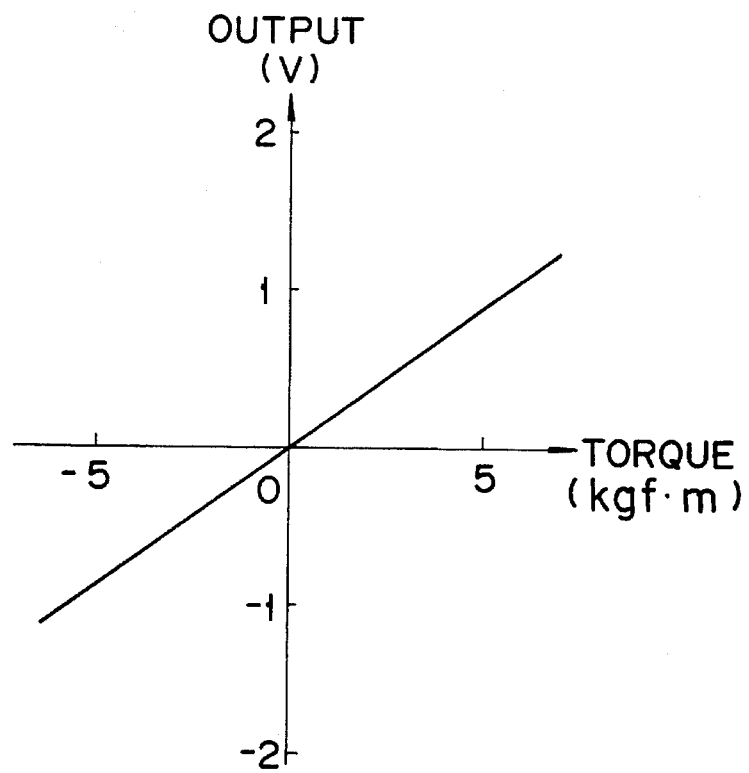
F I G. 13

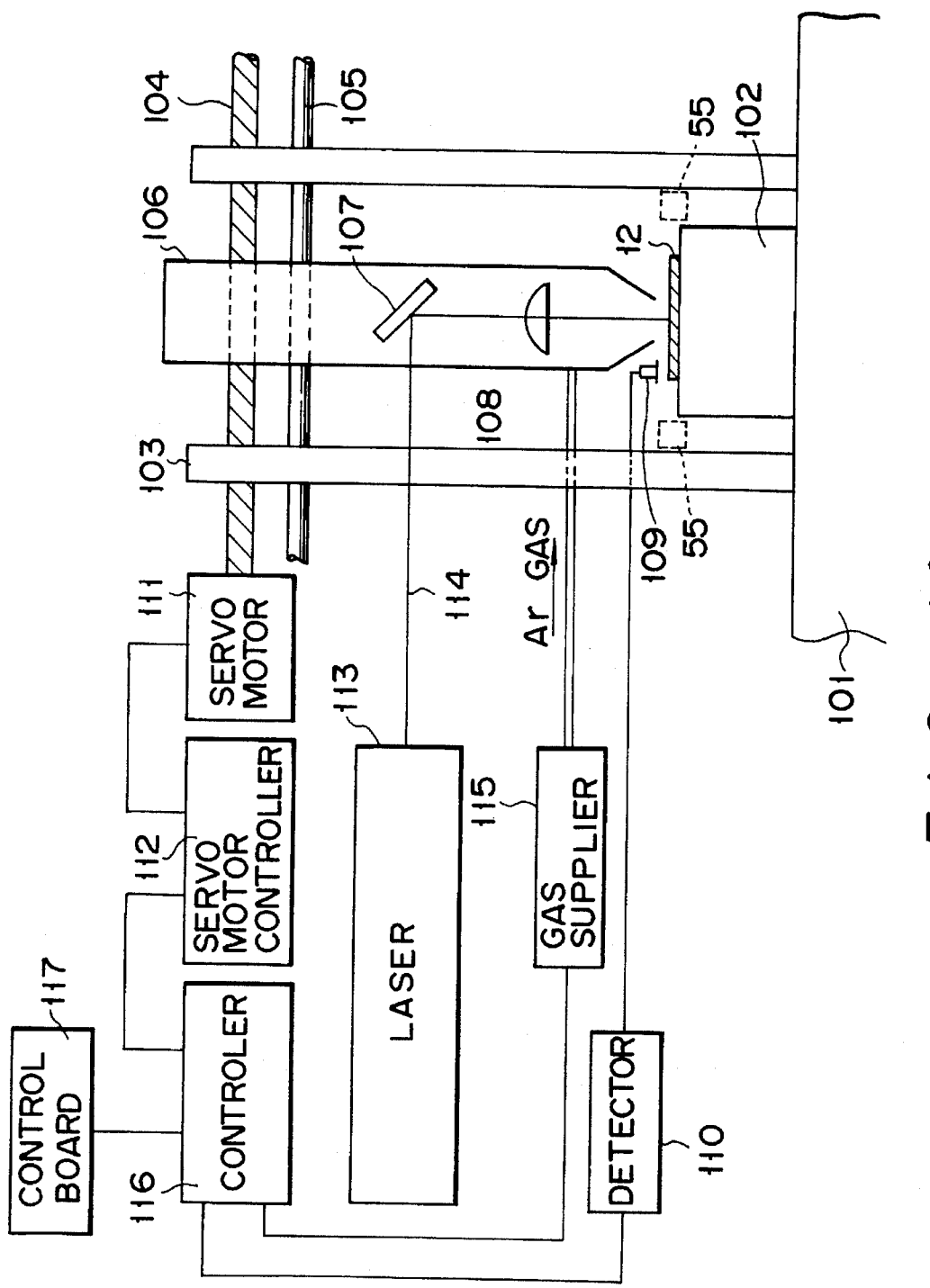
F I G. 14

F I G. 15

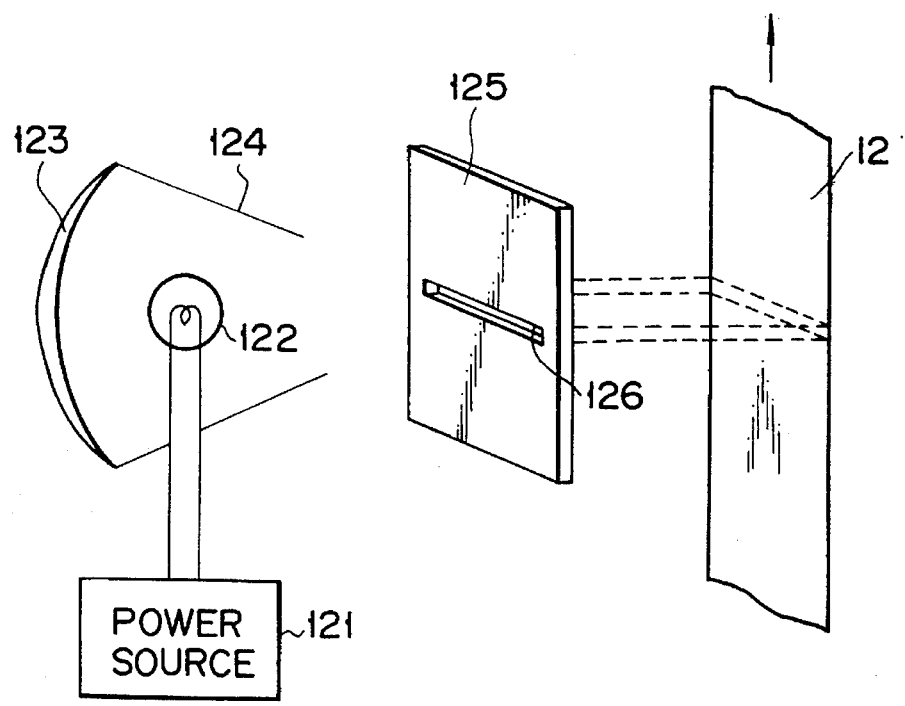
F I G. 16
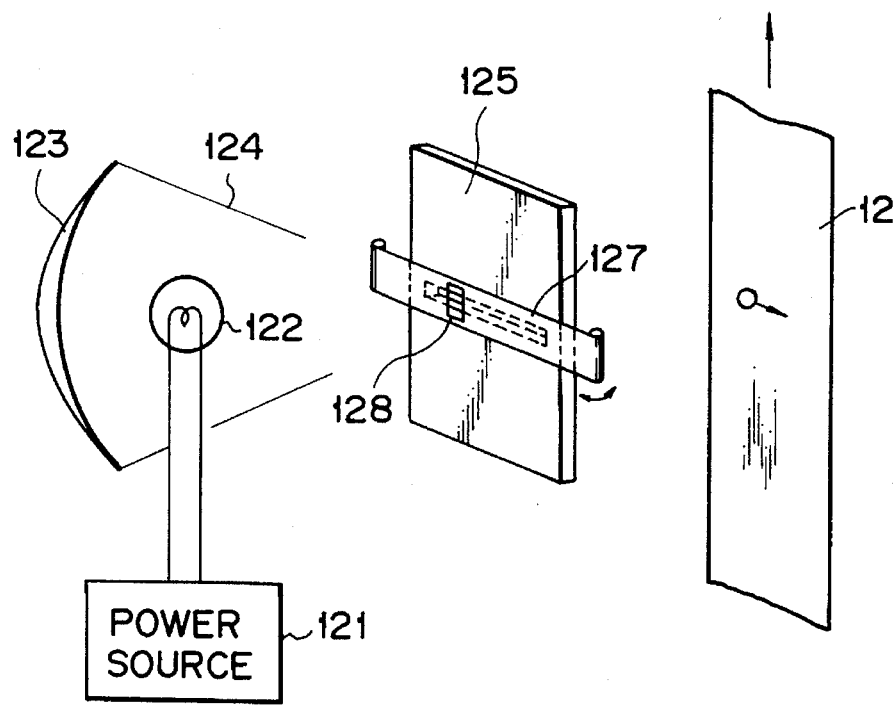
F I G. 17

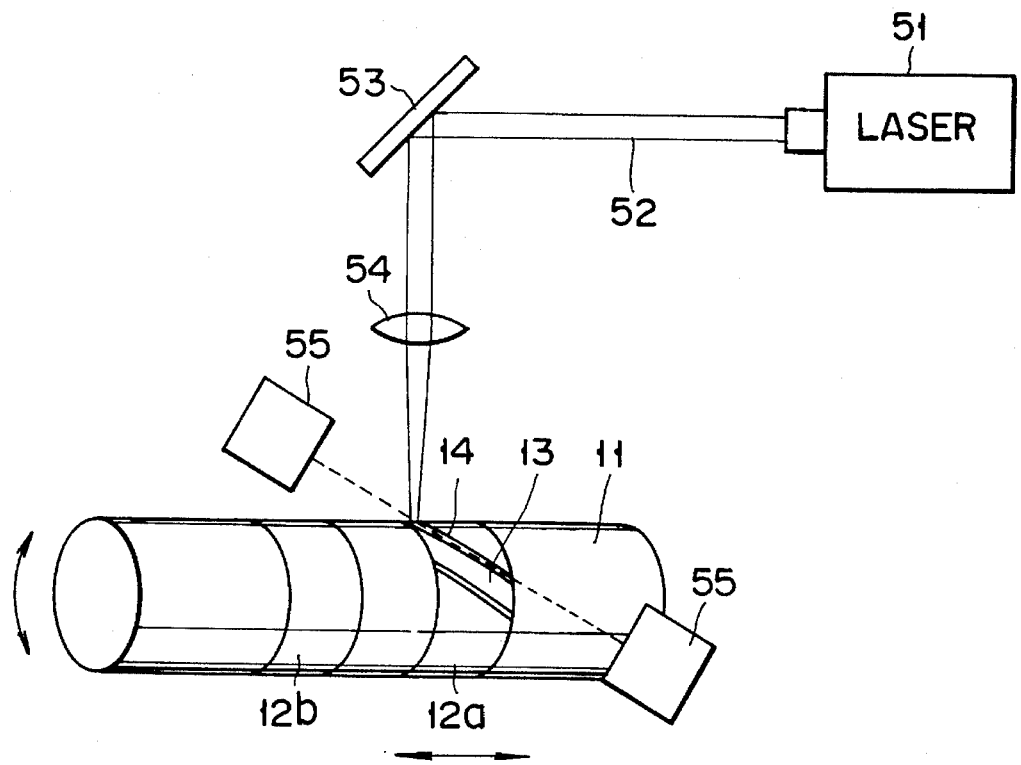
F I G. 18
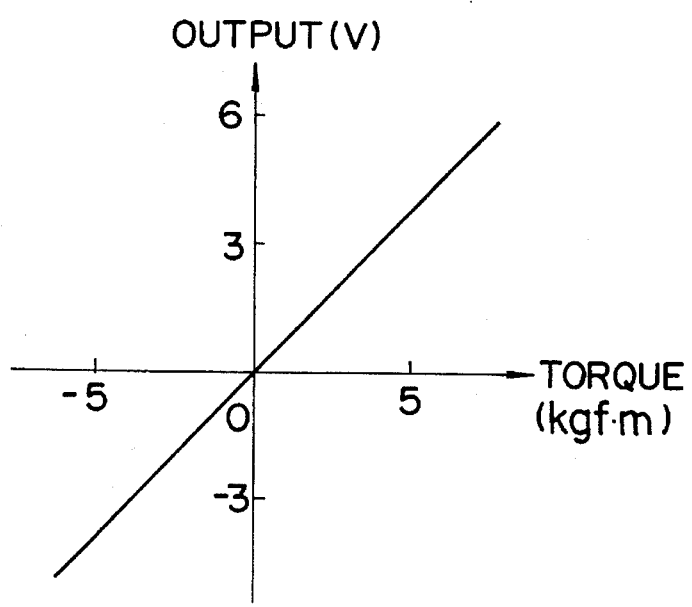
F I G. 19

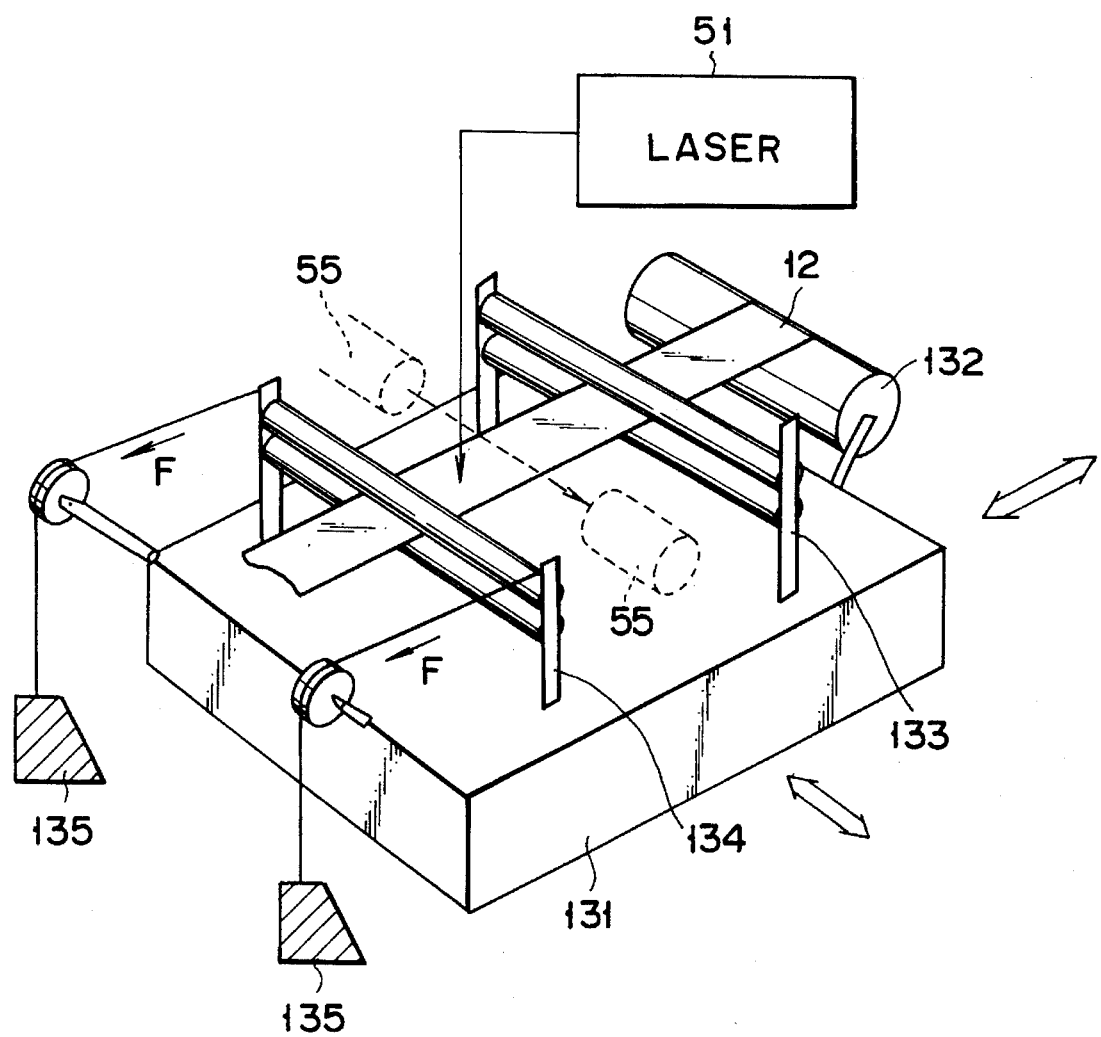
F I G. 21

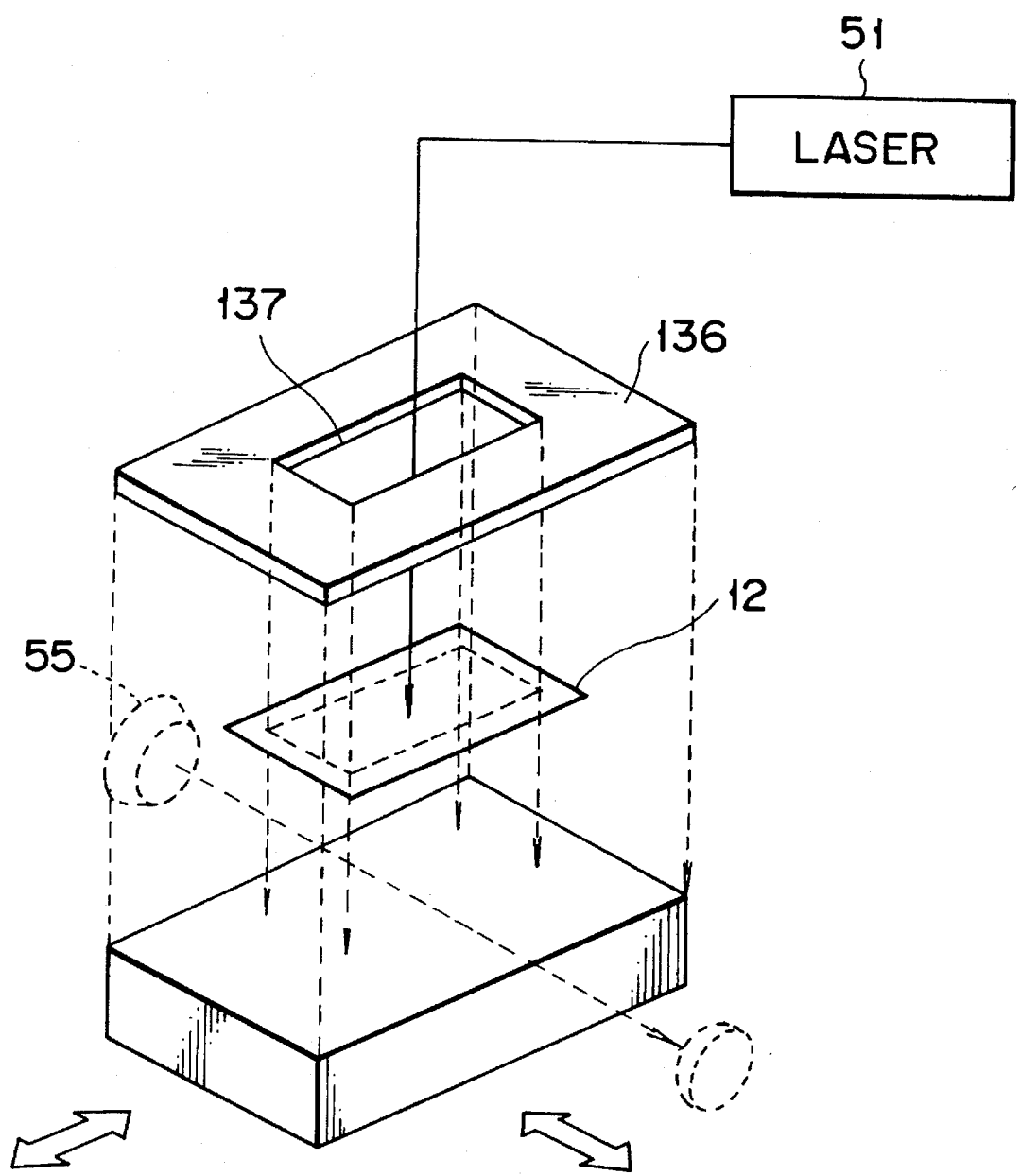
F I G. 23

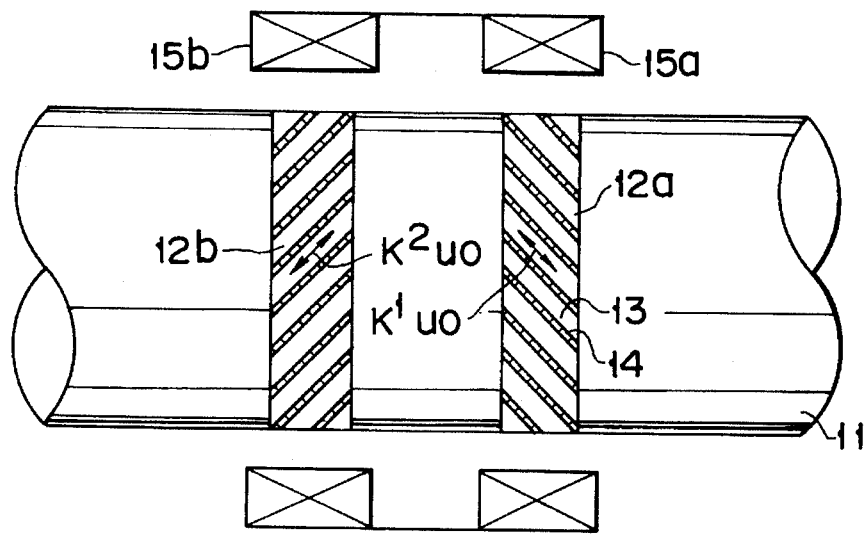
F I G. 26
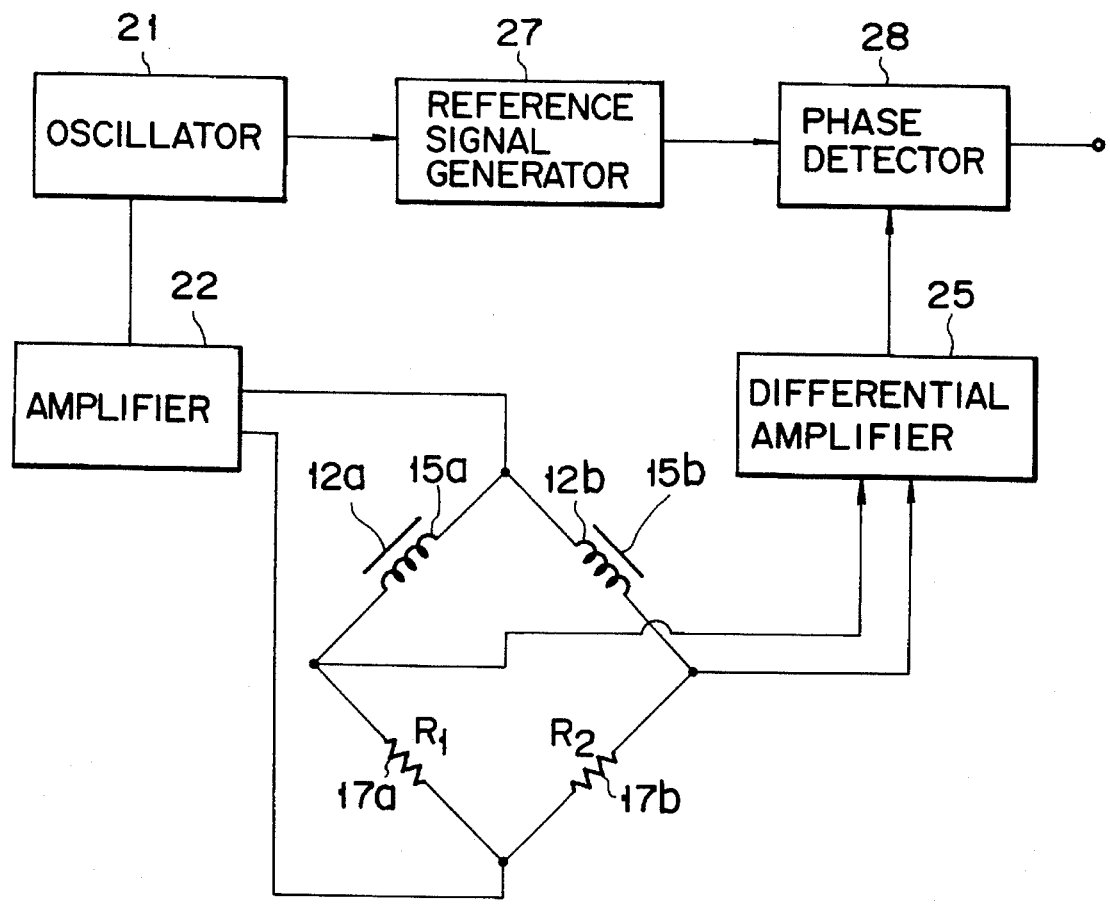
F I G. 27

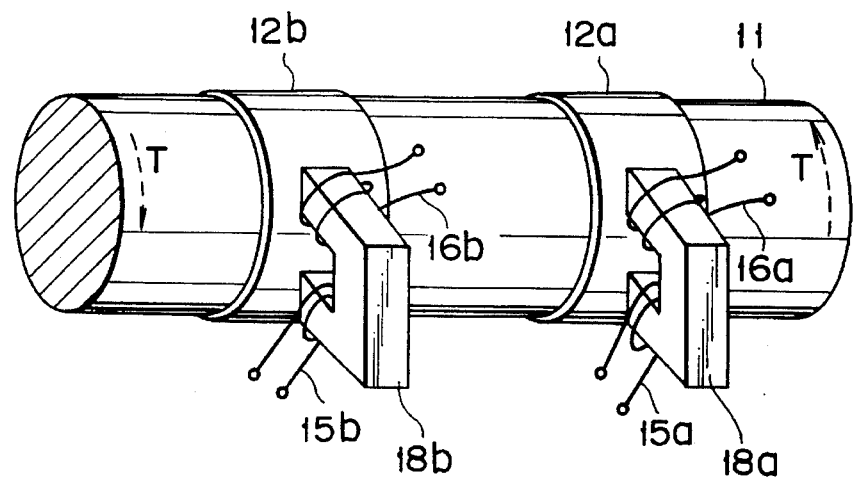
F I G. 28
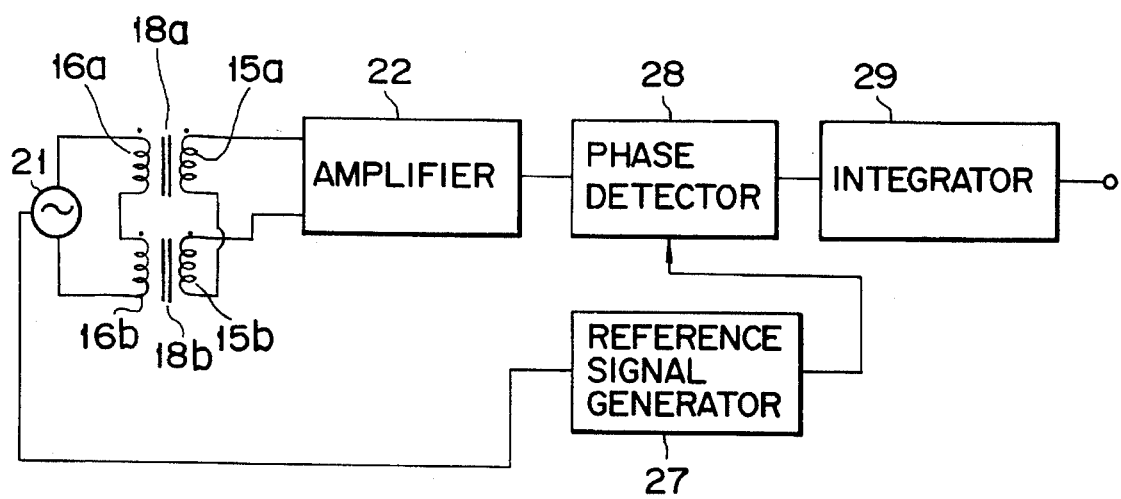
F I G. 29

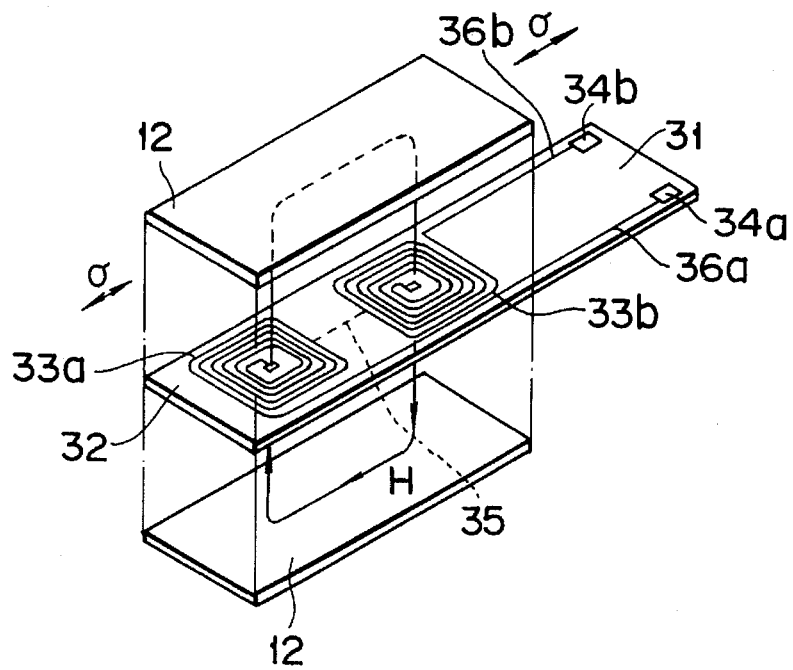
F I G. 30
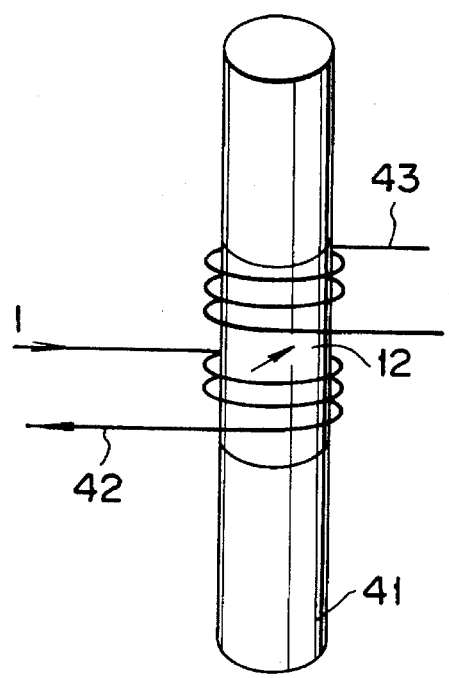
F I G. 31

METHOD OF INTRODUCING MAGNETIC ANISOTROPY INTO MAGNETIC MATERIAL

BACKGROUND OF THE INVENTION

1. Field of the Invention

The present invention relates to a method of introducing magnetic anisotropy into a magnetic material and, more particularly, to a method of introducing magnetic anisotropy into a magnetic material used as a constituting element of various sensors.

2. Description of the Related Art

Various sensors (e.g., a torque sensor, a strain sensor, and a current sensor) using a magnetic material with magnetic anisotropy introduced therein as a constituting element have been developed. In these sensors, a change in external energy to be measured (e.g., a torque acting on a shaft, a strain applied to a flat plate, and a current flowing through a conductor) is converted to a change in magnetic characteristics (e.g., magnetic permeability) in a direction of an easy axis of magnetization of a magnetic material with magnetic anisotropy introduced therein, and the change in magnetic characteristics is detected, thereby detecting the magnitude of each of various external energies.

A uniaxial magnetic anisotropy must be introduced to a magnetic material constituting each of these sensors. Conventionally, the following methods are used to introduce uniaxial magnetic anisotropy into a magnetic material. However, these methods suffer from problems. A case will be exemplified wherein a uniaxial magnetic anisotropy is introduced into a magnetic material on the surface of a shaft constituting a torque sensor. The same applies to cases wherein uniaxial magnetic anisotropy is introduced into magnetic materials constituting other sensors.

(1) An annular magnetic member formed of an amorphous magnetic alloy ribbon is prepared in correspondence with the diameter of a shaft, and is subjected to a heat treatment to remove an internal stress. The magnetic member is then bonded while the shaft is twisted, and thereafter, the shaft is untwisted. In this method, the annular magnetic member must be prepared in advance in correspondence with the diameter of the shaft, and the shaft must be twisted, resulting in complex steps.

(2) A magnetic ribbon is subjected to a heat treatment and cooling in a magnetic field, thereby introducing uniaxial magnetic anisotropy. However, this method is very cumbersome, resulting in poor massproductivity. In addition, it is difficult to perform a heat treatment of an elongated magnetic ribbon. Therefore, the dimensions and shapes of magnetic ribbons are limited. When an amorphous alloy ribbon is subjected to a heat treatment, it becomes fragile.

(3) An amorphous alloy ribbon is bonded to a shaft by a hot isostatic pressing (HIP). Thereafter, a laser pulse is radiated on this ribbon now being crystalline to form a stripe pattern of amorphous phases (Published Unexamined Japanese Patent Application No. 63-280476). In this method, since the magnetic ribbon has a structure in which crystalline phases and amorphous phases are alternately aligned in the form of stripes, magnetic anisotropy can be introduced with this method, however, sufficient magnetic anisotropy cannot always be introduced.

As described above, when various sensors each using a magnetic material with magnetic anisotropy introduced therein as a constituting element are put into practical applications, a countermeasure against problems associated with introduction of magnetic anisotropy to a magnetic material is very important.

SUMMARY OF THE INVENTION

It is an object of the present invention to provide a method which can easily and satisfactorily introduce sufficient magnetic anisotropy into a magnetic material.

In a method of introducing magnetic anisotropy to a magnetic material of the present invention, a surface of a magnetic material is selectively and locally heated to form a boundary phase region pattern for magnetically dividing a main phase of the magnetic material into a plurality of regions, and magnetic anisotropy is introduced into the divided main phase regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view for explaining the principle of a torque sensor prepared in an embodiment of the present invention;

FIG. 2 is a view showing an apparatus used for introducing magnetic anisotropy into a magnetic thin film in Example 1 of the present invention;

FIG. 12 is a view showing an arrangement of a torque sensor prepared by introducing magnetic anisotropy into a magnetic material constituting a shaft in Example 1 of the present invention;

FIG. 13 is a graph showing a torque detection characteristic of a torque sensor prepared by introducing the magnetic anisotropy into the magnetic material constituting the shaft in Example 1 of the present invention;

FIG. 14 is a diagram showing an apparatus used for introducing magnetic anisotropy into a magnetic ribbon in Example 2 of the present invention;

FIG. 15 shows a photograph of magnetic domain configuration of a magnetic ribbon in which magnetic anisotropy is introduced in Example 2 of the present invention;

FIG. 16 is a diagram showing an apparatus used for introducing magnetic anisotropy into a magnetic ribbon in Example 3 of the present invention;

FIG. 17 is a diagram showing another apparatus used for introducing magnetic anisotropy into a magnetic ribbon in Example 3 of the present invention;

FIG. 18 is a diagram showing an apparatus used for introducing magnetic anisotropy to a magnetic thin film in Example 4 of the present invention;

FIG. 19 is a graph showing a torque detection characteristic of a torque sensor prepared in Example 4 of the present invention;

FIG. 21 is a diagram showing an apparatus used for introducing magnetic anisotropy into a magnetic ribbon in Example 5 of the present invention;

FIG. 23 is a diagram showing another apparatus used for introducing magnetic anisotropy into a magnetic ribbon in Example 5 of the present invention;

FIG. 26 is a view showing an arrangement of another torque sensor;

FIG. 27 is a block diagram showing a circuit arrangement of the torque sensor shown in FIG. 26;

FIG. 28 is a view showing an arrangement of still another torque sensor;

FIG. 29 is a block diagram showing a circuit arrangement of the torque sensor shown in FIG. 28;

FIG. 30 is a perspective view showing an arrangement of a strain sensor; and

FIG. 31 is a perspective view showing an arrangement of a current sensor.

DETAILED DESCRIPTION OF THE PREFERRED EMBODIMENTS

Figure 3:
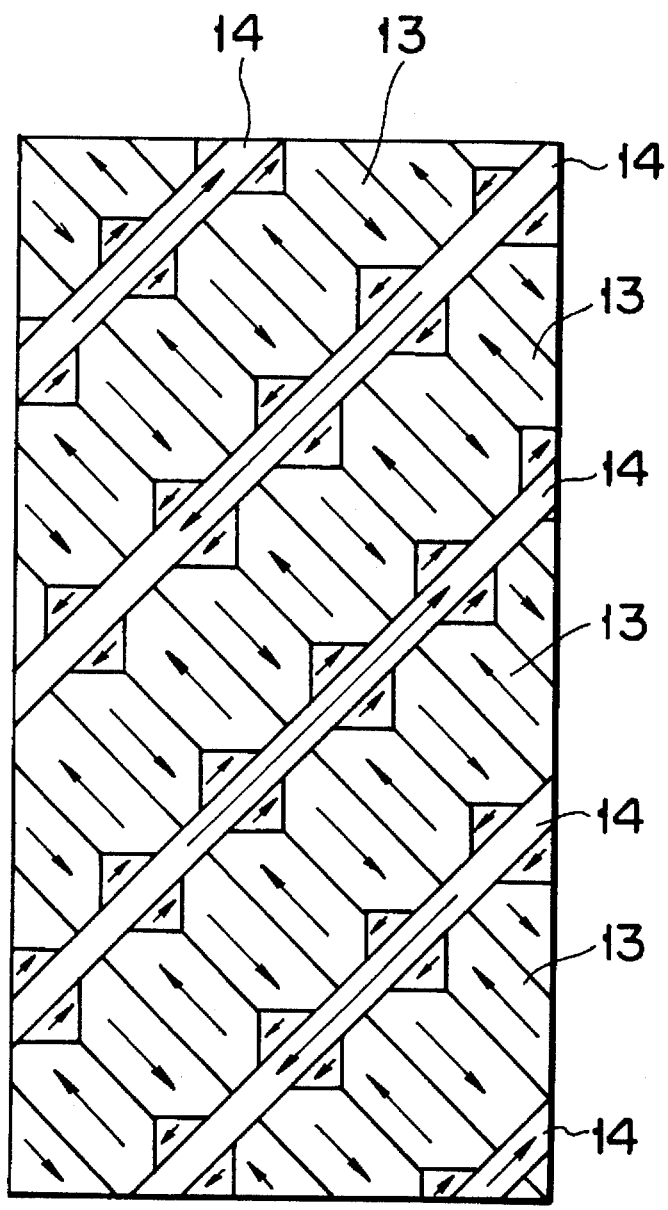
FIG. 3 is a view showing a magnetic domain model of a magnetic material in which magnetic anisotropy is introduced in Example 1 of the present invention.

According to the present invention, a magnetic material in which magnetic anisotropy is introduced is used such as a constituting element of various sensors. In a torque sensor, for example, a shaft itself may be a magnetic material, or a magnetic ribbon may be bonded or a magnetic thin film may be formed on the surface of the shaft of the torque sensor. Methods of forming a magnetic thin film on the surface of the shaft include (1) a method by means of a vapor phase growth method such as sputtering, a plating method, a flame coating method, or a welding method; (2) a method in which a laser beam is radiated while supplying a magnetic powder onto the surface of a shaft; (3) a method by means of the HIP; and the like. A magnetic material may consist of any of an amorphous or crystalline alloy, or a compound magnetic material such as a magnetic oxide. In these method, it is recommended to select optimal process parameter (e.g. Ar pressure in sputtering method) so as to give a magnetic material having soft magnetic characteristics. When a crystalline magnetic material is formed, it is preferable to perform a stress relief heat treatment.

The composition of the amorphous alloy is not particularly limited. An amorphous alloy having a large magnetostriction is preferably one having a composition expressed by formula (I):

$$(Fe_{1-a-b}M_aM'_b)_ZSi_XB_Y \qquad (I)$$

(wherein M: at least one of Co and Ni,

M': at least one element selected from the group consisting of Ti, Zr, Hf, V, Nb, Ta, Cr, Mo, W, Mn, Re, Ru, Rh, Ir, Pd, Pt, Ag, Au, Cu, Zn, Al, Ga, In, Ge, Sn, Pb, Sb, Bi, Y, and rare-earth metals, When M=Ni, $0.1 \leq a \leq 0.4$ When M=Co, $0.2 \leq a \leq 0.99$  $0 \leq b \leq 0.15$, $0 \leq X \leq 20$, $4 \leq Y \leq 35$, $X+Y+Z=100$)

For an Fe-based amorphous alloy, it is difficult to introduce magnetic anisotropy by a conventional heat treatment in a magnetic field. In the method of the present invention, sufficient magnetic anisotropy can be introduced into an Fe-based amorphous alloy over a wide composition range expressed by formula (I). In particular, when an amorphous magnetic alloy is formed by a method, e.g., sputtering, a composition range can be widened. However, when an amorphous magnetic ribbon is formed by a quenching roll method, the composition range is slightly limited by an amorphous formation performance.

In formula (I), M is an indispensable element for obtaining large induced magnetic anisotropy $K_{u0}$, and at least one of Co and Ni is used. In the conventional heat treatment in a magnetic field, when an M content falls outside a certain range, large induced magnetic anisotropy cannot be obtained. On the other hand, according to the method of the present invention, a wide M content range can be assured as described above.

In formula (I), B is an indispensable element for forming an amorphous alloy. Y indicating a B content must be 4 or more. Si is an element having a function of increasing a crystallization temperature. When X indicating an Si content exceeds 20, saturated magnetization becomes small, and satisfactory magnetic characteristics are difficult to obtain. If a total content of B and Si is too large, magnetic characteristics are impaired. Therefore, it is preferable that X+Y does not exceed 35.

In formula (I), M' is an element for increasing a crystallization temperature of an amorphous magnetic alloy, improving thermal stability, adjusting the magnitude of a thermal expansion coefficient, and improving corrosion resistance. As M', at least one element selected from the above-mentioned elements is used.

In place of a metal-semimetal-based amorphous alloy expressed by formula (I), a metal-metal-based amorphous alloy expressed by formula (II) may be used.

$$Co_{100-\alpha-\beta}M''_{\alpha}M'''_{\beta} \qquad (II)$$

wherein M" is at least one element selected from the group consisting of Nb, Ti, Hf, Zr, and Y, M''' is at least one element selected from the group consisting of Fe, Co, Ni, V, Ta, Cr, Mo, W, Mn, Re, Rh, Ir, Pd, Pt, Ag, Au, Cu, Zn, Al, Ga, In, Ge, Sn, Pb, Bi, and rare-earth metals, $$2 \leq \alpha \leq 25, 0 \leq \beta \leq 30)$$

In an amorphous alloy expressed by formula (II), Co is an indispensable element. M" substituted with part of Co is an indispensable element for forming amorphous material. If $\alpha$ is less than 2, an amorphous metal cannot be obtained. If $\alpha$ exceeds 25, an amorphous metal cannot be obtained, and saturated magnetization ($M_S$) is considerably impaired. As a result, the obtained magnetic metal is not suitable for a sensor.

In formula (II), M''' is an element which accelerates an amorphous metal-forming function by M", and facilitates control of a metal-forming value necessary for a sensor. A Co-M"-based amorphous alloy containing no M''' may be used. If $\beta$ exceeds 30, a magnetostriction value necessary for a sensor cannot be obtained, and amorphous metal is difficult to form.

A crystalline magnetic material includes an alloy of Fe—Ni (Parmalloy), and the like. An magnetic oxide includes a ferrite, and the like.

When the method of the present invention is applied to the manufacture of a torque sensor; after a magnetic ribbon is bonded to a shaft or a magnetic thin film is formed on the shaft, magnetic anisotropy may be introduced therein; or after magnetic anisotropy is introduced into a magnetic ribbon in advance, it may be bonded to a shaft.

According to the present invention, means for locally heating the surface of a magnetic material in order to introduce magnetic anisotropy into the magnetic material include any energy beam, for example, a laser beam emitted from such as a YAG laser, a $CO_2$ laser, or the like, an ion beam, an electron beam, an infrared beam. In a region irradiated with an energy beam, a structure of a intrinsic main phase constituting a magnetic material is changed, and a boundary phase having magnetic characteristics different from those of the main phase is formed. For example, a structure of an amorphous main phase is relaxed, and an amorphous or crystalline boundary phase having magnetic characteristics different from those of the main phase is formed. It can also be considered that an internal stress remains due to local annealing or melting, and stress-induced magnetic anisotropy is introduced into a main phase. A combination of main phases and boundary phases constituting a magnetic material can be any of: main phase-amorphous phase, boundary phase-amorphous phase; main phase-amorphous phase, boundary phase-crystalline phase; and main phase-crystalline phase, boundary phase-crystalline phase. A difference between magnetic characteristics (e.g., coercivity) of the main and the boundary phases is preferably 5% or more.

when an energy beam is radiated onto a magnetic material, a spot of the energy beam can be scanned continuously or discontinuously. According to the way of scanning, the shape of the boundary phase becomes a line or dot. The spot of the energy beam is scanned at a given pitch along a predetermined direction. In consideration of an easy operation and introduction of sufficient magnetic anisotropy, a stripe pattern of linear boundary phases is preferably formed.

With these operations, the magnetic domains of the main phase are controlled, and uniaxial magnetic anisotropy can be introduced along a predetermined direction. In order to control magnetic characteristics of the main phases in this manner, a ratio of an area occupied by the boundary phases in a magnetic material is preferably less than 50% and, more preferably, 30% or less. Note that the direction of uniaxial magnetic anisotropy introduced into the magnetic material can be variously changed, e.g., can coincide with a scanning direction of an energy beam or can be perpendicular to the scanning direction according to a spot size (width of boundary phase) and a scanning pitch (interval between adjacent boundary phases) of an energy beam. The direction of uniaxial magnetic anisotropy is preferably, for example, a main stress direction determined when the magnetic material is used in a sensor. However, it is not particularly limited. The structure of a boundary phase is also changed depending on, e.g., a scanning rate of an energy beam, and magnetic characteristics of the boundary phase are changed accordingly. Therefore, the spot size and the scanning pitch may be changed according to the scanning rate. That is, energy beam radiation conditions are preferably appropriately set. More specifically, the spot size (width of the boundary phase) of the energy beam preferably falls within a range of 1 µm to 1 mm, and the scanning pitch (interval between adjacent boundary phases) of the energy beam preferably falls within a range of 50 µm to 10 mm. The width of the boundary phase is preferably 100 µm or less, and the interval between adjacent boundary phases is preferably 200 µm or more. When the interval is too large, a dividing effect by the boundary phase cannot be easily obtained. Therefore, the interval is preferably 2 mm or less.

In the method disclosed in Published Unexamined Japanese Patent Application No. 63-280476 described above, magnetic characteristics of a magnetic material are controlled by a region irradiated with a laser beam (amorphous phase), and magnetic anisotropy is imparted in the scanning direction of the laser beam. In contrast to this, in the method of the present invention, when a boundary phase pattern is formed by locally heating a magnetic material, non-heated main phase regions control the magnetic characteristics of the magnetic material, and magnetic anisotropy can be introduced in either the scanning direction or a direction perpendicular thereto depending on the selected conditions. It can be considered that this mechanism is caused by magnetic domain realignment, stress-induced magnetic anisotropy, and the like. In this manner, the two methods have different mechanisms of introducing magnetic anisotropy. In the method of the present invention, since a continuous treatment is allowed, the dimensions of a magnetic material will not be restricted by the scale of a treatment apparatus unlike in the conventional heat treatment in a magnetic field.

According to the present invention, when an energy beam is radiated on a magnetic material, one of the following methods may be combined: a magnetic field is applied to a magnetic material; a stress is applied to a magnetic material; and both a magnetic field and a stress are applied to a magnetic material. The magnitude of the stress preferably falls within a range of 0.1 to 150 kg/mm² although it depends on a breaking strength of a magnetic material. When these methods are used together, magnetic anisotropy induced by radiation of an energy beam, magnetic anisotropy induced by a magnetic field, and stress-induced magnetic anisotropy can be combined, and complex magnetic anisotropy can be easily introduced.

According to the present invention, an energy beam may be radiated on a magnetic material in an atmosphere wherein a compound of the magnetic material is formed. Such an atmosphere includes an oxidizing atmosphere (e.g. air or $O_2$), a nitrogen atmosphere, or the like. For a magnetic oxide, a reducing atmosphere (e.g. $H_2$) may be used. In this case, a combination of a main phase and a boundary phase constituting a magnetic material is, for example, main phase-amorphous phase or crystalline phase, and boundary phase-compound phase containing oxide or nitride.

A magnetic material in which uniaxial magnetic anisotropy is introduced as described above can be applied to sensors, e.g., a torque sensor, a strain sensor, a current sensor, and the like; a magnetic core; and the like.

For example, the principle of a torque sensor will be explained below with reference to FIG. 1. In FIG. 1, a magnetic thin film 12 is fixed to the surface of a shaft 11. Uniaxial magnetic anisotropy $K_{UO}$ having an easy axis of magnetizition in a direction of an angle θ (≠0) with respect to a circumferential direction of the shaft 11 is imparted to the magnetic thin film 12 in advance. An excitation coil and a detection coil are arranged adjacent to the magnetic thin film 12, and the detection coil is connected to a detector (not shown).

By using a torque sensor with the above arrangement, a torque can be detected as follows. For the sake of simplicity, assume that θ=45° and a saturation magnetostriction constant $\lambda_S>0$. Assuming that a torque T indicated by a broken curve acts on the shaft 11, a surface strain stress is transmitted to the magnetic thin film 12, and a tensile stress σ is generated in the magnetic thin film 12 in a +45° direction, and a compressive compression stress −σ is generated in the magnetic thin film 12 in a −45° direction, with respect to the circumferential direction of the shaft 11. Stress-induced magnetic anisotropy $K_{US}$ ($K_{US}=3 \lambda_S \cdot \sigma$) is induced in the magnetic thin film 12 in the +45° direction by the magnetostriction effect. As a result, $K_{UO}$ and $K_{US}$ are synthesized, and the uniaxial magnetic anisotropy is changed to $K_{UX}$. In this case, if a direction of magnetic fluxes passing inside the magnetic thin film 12 is constant, the permeability in the magnetic flux passing direction in the magnetic thin film 12 is changed when the uniaxial magnetic anisotropy is changed. Therefore, the change in permeability can be measured by the detection coil and the detector connected to it, and the torque T acting on the shaft 11 can be obtained based on the detected value.

In order to detect torques in normal and reverse rotations with good linearity by the torque sensor described above, the torque sensor must comprise a pair of magnetic thin films to which uniaxial magnetic anisotropy $K_{UO}$ is imparted in advance in directions of +θ and −θ (except for 0°, 90°, 180°, and 270°) with respect to the circumferential direction of the shaft 11, and a pair of detection coils or detection heads differentially coupled to detect a change in magnetic characteristics of these magnetic thin films.

Similarly, in order to detect target external energies, other sensors also utilize magnetic anisotropy of magnetic materials.

The present invention will be described in detail below by way of its examples. In the following examples, a case will be mainly explained wherein magnetic anisotropy is introduced into a magnetic material used in a torque sensor.

EXAMPLE 1

A method of introducing magnetic anisotropy by locally heating a magnetic thin film formed on the surface of a shaft will be described below.

A target having a special shape is set in an RF sputtering apparatus. Then a pair of magnetic films each consisting of a 10-mm wide and 15-μm thick amorphous alloy having a composition expressed by the following formula are formed on two portions of the surface of a shaft formed of a ferromagnetic material (S45C) and having a diameter of 20 mm:

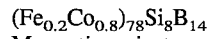

Magnetic anisotropy is introduced into these magnetic thin films using the apparatus shown in FIG. 2. A laser beam 52 emitted from a laser 51 is reflected by a mirror 53, is focused by a lens 54, and is radiated on magnetic thin film 12a (or 12b) on the surface of the shaft 11 while the shaft 11 is rotated and is moved in its longitudinal direction. In this case, the spot size of the laser beam is set to be 100 μm, and is continuously radiated to have a scanning rate of 3 mm/min. The scanning direction of the laser beam is set to be a +45° direction for the magnetic member 12a and to be a −45° direction for the magnetic member 12b, with respect to the circumferential direction of the shaft 11. The above-mentioned operations are repeated at a 1-mm pitch. As a result, on regions irradiated with the laser beam, structural relaxation occurs, thus forming amorphous boundary phases 14 having magnetic characteristics different from those of amorphous main phases 13. These boundary phases 14 are aligned in a stripe manner.

FIG. 3 shows a model of magnetic domains on the surface of a magnetic material having two types of amorphous phases having different magnetic characteristics, i.e., main phases 13 and boundary phases 14. As shown in FIG. 3, magnetic domains are patterned in a step- or ladder-like shape, and magnetic domain control is achieved in correspondence with the laser beam radiation direction. The laser beam radiation direction serves as a direction of an easy axis of magnetization, so that uniaxial magnetic anisotropy $K^1_{UO}$ is introduced into the magnetic thin film 12a in a +45° direction, and uniaxial magnetic anisotropy $K^2_{UO}$ is introduced into the magnetic thin film 12b in a −45° direction.

A direction of magnetic anisotropy into a magnetic thin film varies depending on a spot size, scanning rate, scanning pitch, and the like of a laser beam. For example, when a YAG laser is used, and an operation for scanning a laser beam having a spot size of 50 μm at a rate of 10 m/min is repeated at a 0.5-mm pitch, magnetic anisotropy is introduced in a direction perpendicular to the scanning direction of the laser beam. More specifically, the magnetic anisotropy is introduced into the magnetic thin film 12a in a −45° direction, and into the magnetic thin film 12b in a +45° direction.

Figure 4:
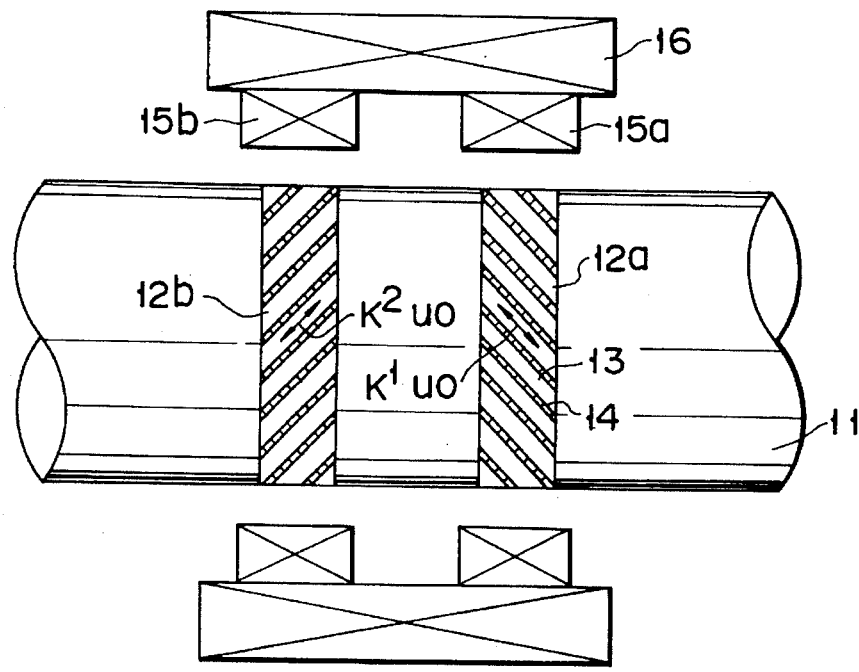
FIG. 4 is a view showing an arrangement of a torque sensor prepared in Example 1 of the present invention.

FIG. 4 shows an arrangement of a torque sensor prepared in this case. Cylindrical detection coils 15a and 15b are arranged in a non-contact manner around the shaft 11 on which the pair of magnetic members 12a and 12b with magnetic anisotropy introduced therein are formed. A cylindrical excitation coil 16 is arranged around the detection coils 15a and 15b. The detection coils 15a and 15b and excitation coil 16 are prepared by winding a copper wire having a diameter of 0.3 mm around frames formed of a nonmagnetic material, 100 turns for detection coils, 300 turns for excitation coil.

Figure 5:
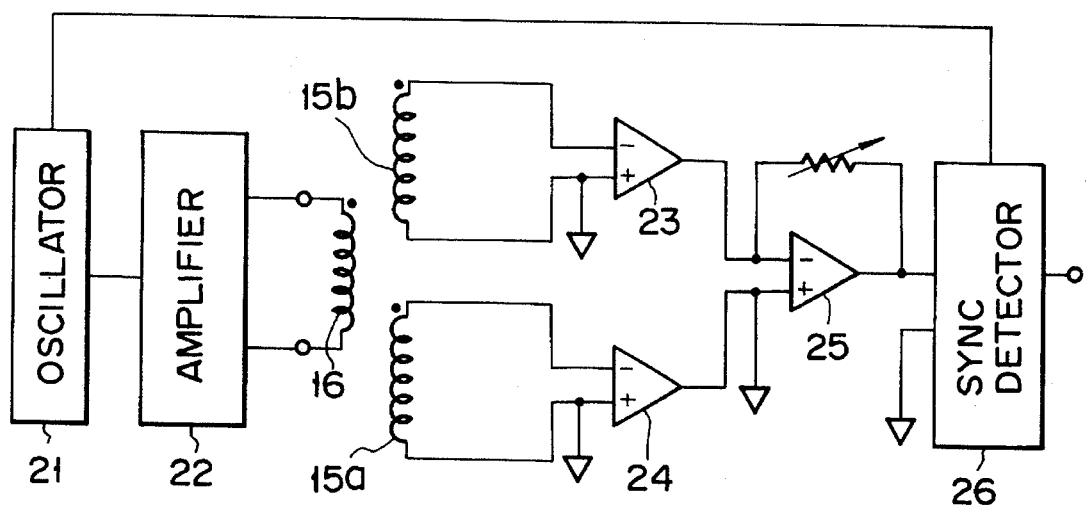
FIG. 5 is a block diagram showing a circuit arrangement of a torque sensor prepared in Example 1 of the present invention.

FIG. 5 is a block diagram showing a circuit arrangement of this torque sensor. A sine wave excitation current at a frequency of 100 kHz is generated by an oscillator 21, and is amplified by an amplifier 22. The amplified current is applied to the excitation coil 16, so that an AC magnetic field is applied to the magnetic thin films 12a and 12b. When a torque acts on the shaft 11, the magnetic permeabilities of the magnetic thin films 12a and 12b along a magnetic flux passing direction are changed according to the abovementioned principle. In correspondence with the These signals are amplified by differential amplifiers 23, 24, and 25, and the amplified signals are rectified by a synchronous detector 26. In this manner, a DC voltage output which changes according to a change in torque can be obtained.

Figure 6:
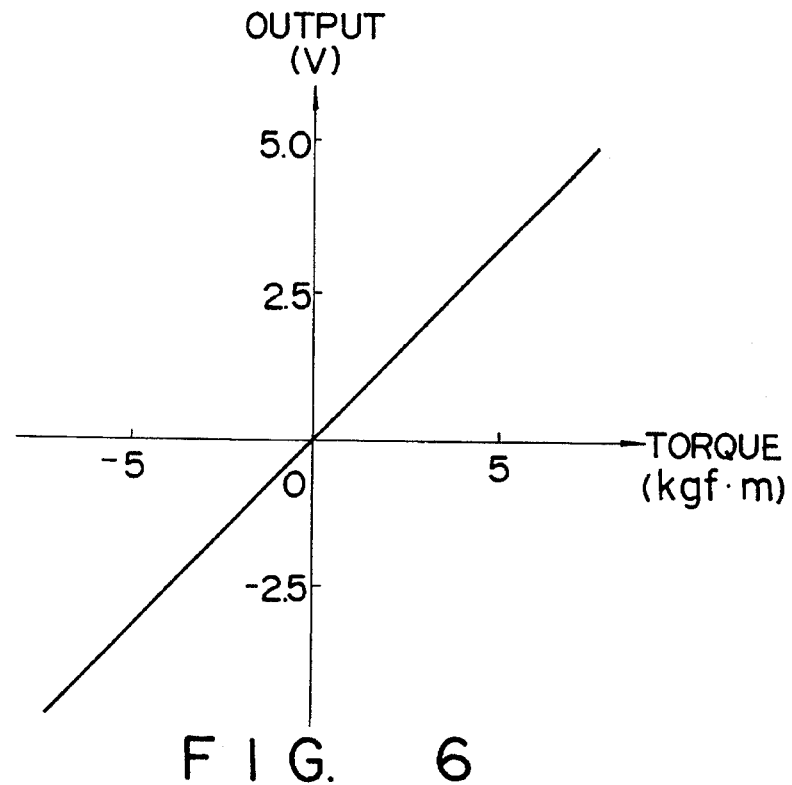
FIG. 6 is a graph showing a torque detection characteristic of a torque sensor prepared in Example 1 of the present invention.

FIG. 6 shows a torque detection result by the torque sensor of this embodiment. As can be seen from FIG. 6, the output of this torque sensor exhibits good linearity over a wide torque range.

Figure 7:
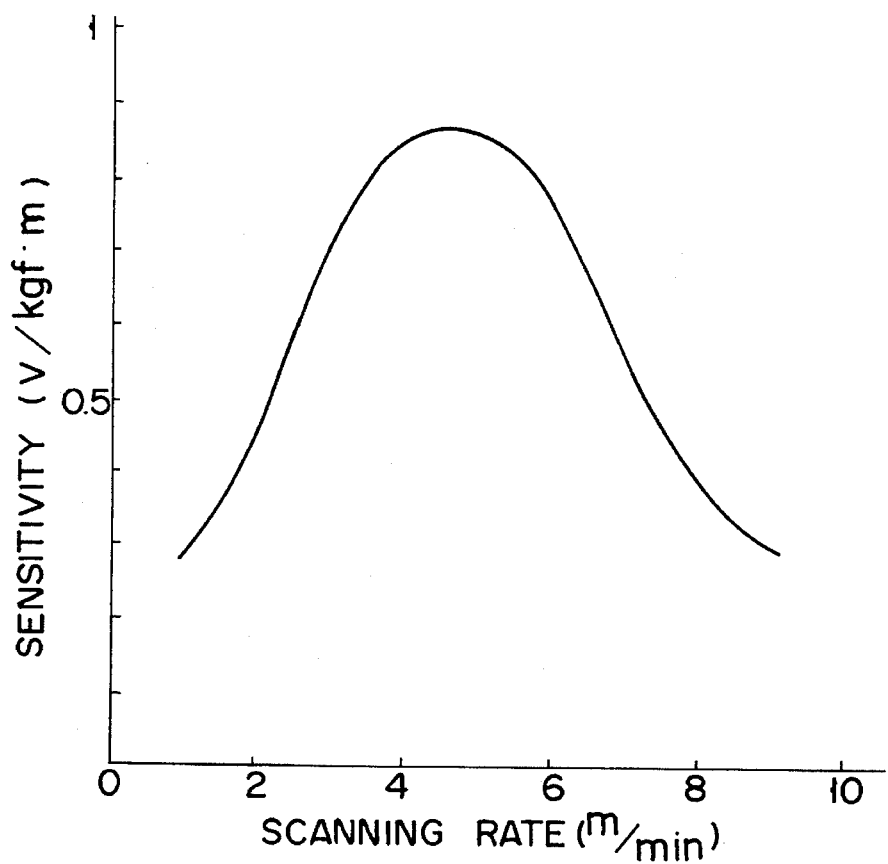
FIG. 7 is a graph showing the relationship between a scanning rate of a laser beam and a sensitivity of the torque sensor prepared in Example 1 of the present invention.

FIG. 7 shows the relationship between a laser beam scanning rate when a boundary phase pattern is formed and a sensor sensitivity. As can be understood from FIG. 7, there is an optimal laser beam scanning rate to obtain a good sensitivity.

It can be considered that this is caused by a change in magnetic characteristics of a magnetic thin film due to a change in amorphous structure of a boundary phase according to a laser scanning rate. The crystal structure of the magnetic thin film was examined by normal X ray diffraction under conditions of 40 kv, 20 mA, and a Cu line source, and the following facts were found. In the case of the left end of FIG. 7, a boundary phase region irradiated with a laser beam is crystallized. In a range of other scanning rates including an optimal laser beam scanning rate, a boundary phase is not crystallized, and the entire magnetic thin film is amorphous. More specifically, when the laser beam scanning rate is low, the influence of local heating is considerable, and a laser beam radiation region is crystallized. On the other hand, since an optimal scanning rate range with which a good sensitivity can be obtained is a high scanning rate range, even a locally heated region merely causes structural relaxation, and no crystalline phase is produced. Both a main phase, and a boundary phase causing structural relaxation upon radiation of a laser beam are amorphous but have different magnetic characteristics.

Even when a laser beam scanning rate is changed in a wide range shown in FIG. 7, torque detection characteristics with good linearity can be obtained. For example, a YAG laser is used, and an operation of scanning a laser beam having a spot size of 100 µm at a rate of 1 m/min is repeated at a 1-mm pitch (condition for the left end of FIG. 7). In this case, as described above, regions irradiated with a laser beam are crystallized, and crystalline boundary phases having magnetic characteristics different from those of amorphous main phases are formed. These boundary phases are aligned in a stripe shape. In this manner, even when the main phases are amorphous and boundary phases are crystalline, torque detection characteristics with good linearity can be obtained.

Since the laser beam scanning rate largely depends on a laser beam power, thermal conductivity and heat capacity of a radiation region, and the like, an optimal laser beam scanning rate is preferably determined to obtain a good sensor sensitivity according to these conditions. A laser beam radiation pitch preferably falls within a range of 50 µm to 10 mm. If the pitch is less than 50 µm, magnetic domain configuration shown in FIG. 3 cannot be obtained. When the pitch exceeds 10 mm, sufficient magnetic anisotropy cannot be introduced. For this reason, in either case, a satisfactory torque sensor cannot be obtained. The width of a boundary phase region preferably falls within the range of 1 µm to 0.2 mm. The boundary phase region need not always be a linear region, but may be a dot region as long as magnetic anisotropy can be exhibited.

A laser beam is radiated onto amorphous alloys having various compositions expressed by formula (I), as described above, to form stripe amorphous boundary phases, thereby introducing magnetic anisotropy. The same torque sensors as in FIG. 4 are prepared. Table 1 below summarizes measurement results of sensitivities of these torque sensors.

TABLE 1

| No | Composition | Sensitivity (mV/kgf · m) |
|---|---|---|
| 1 | $(Fe_{0.75}Ni_{0.25})_{75}Si_9B_{17}$ | 500 |
| 2 | $(Fe_{0.8}Co_{0.2})_{78}Si_{10}B_{12}$ | 850 |
| 3 | $Co_{60}Fe_{20}B_{20}$ | 350 |
| 4 | $(Fe_{0.1}Co_{0.9})_{78}Si_{10}B_{12}$ | 500 |
| 5 | $(Fe_{0.5}Co_{0.5})_{81}Si_{10}B_9$ | 900 |
| 6 | $(Fe_{0.3}Ni_{0.2}Co_{0.5})_{78}Si_{11}B_{11}$ | 400 |
| 7 | $(Fe_{0.65}Ni_{0.3}Cr_{0.05})_{80}Si_{10}B_{10}$ | 500 |
| 8 | $(Fe_{0.35}Co_{0.6}Nb_{0.05})_{80}Si_{10}B_{10}$ | 450 |
| 9 | $Fe_4Co_{70}Mn_4B_{26}$ | 500 |
| 10 | $(Fe_{0.2}Co_{0.8})_{78}Si_8B_{14}$ | 700 |
| 11 | $Fe_{77}Si_8B_{15}$ | 750 |

Figure 8:
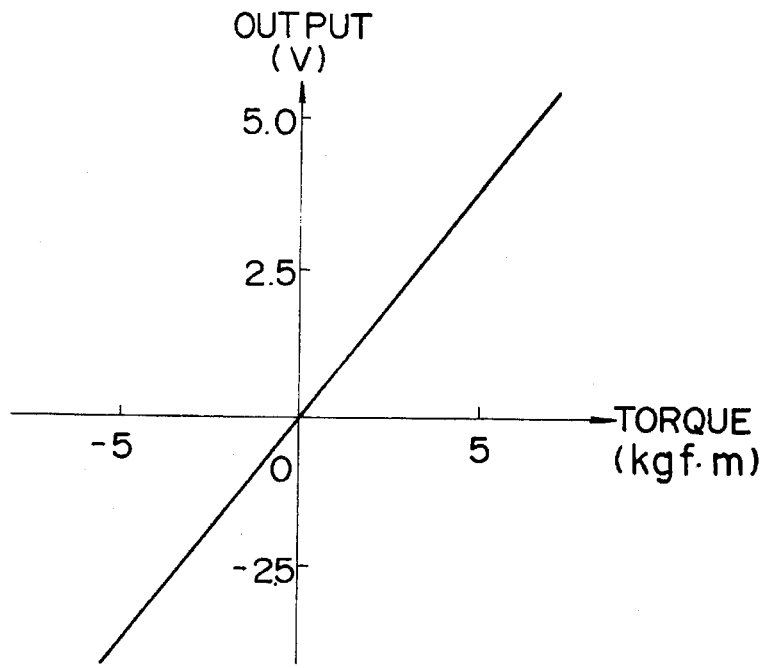
FIG. 8 is a graph showing a torque detection characteristic of a torque sensor prepared using another magnetic material in Example 1 of the present invention.
Figure 9:
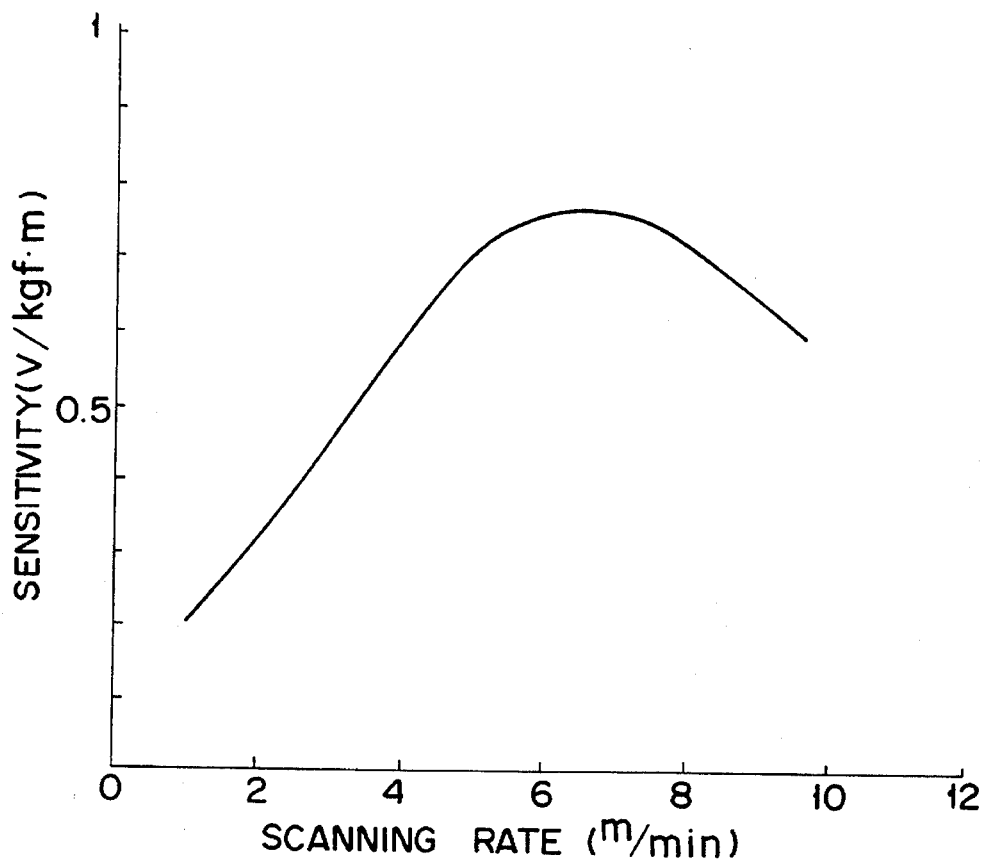
FIG. 9 is a graph showing the relationship between a scanning rate of a laser beam and a sensitivity of the torque sensor prepared using another magnetic material in Example 1 of the present invention.

The laser beam is radiated in the same manner as described above except that an amorphous alloy having a composition of $Co_{80}Zr_{15}Fe_5$ is used, and a scanning rate of laser beam is set to be 6 m/min to form stripe amorphous boundary phases, thereby introducing magnetic anisotropy. Thus, sensors as in FIG. 4 are prepared. FIG. 8 shows a torque detection result by the torque sensor of this embodiment. FIG. 9 shows the relationship between a laser beam scanning rate and a sensitivity. As can be seen from these results, an excellent torque sensor can be obtained. A laser beam is radiated onto amorphous alloys having various compositions expressed by formula (II) described above, to form stripe amorphous boundary phases, thereby introducing magnetic anisotropy. The same torque sensors as in FIG. 4 are prepared. Table 2 below summarizes measurement results of sensitivities of these torque sensors.

TABLE 2

| No | Composition | Sensitivity (mV/kgf · m) |
|---|---|---|
| 12 | $Co_{85}Zr_{10}Fe_5$ | 760 |
| 13 | $Co_{98}Zr_2$ | 880 |
| 14 | $Co_{70}Hf_5Zr_{10}Fe_{10}Mo_5$ | 500 |
| 15 | $Co_{76.5}Mn_{8.5}Nb_{15}$ | 650 |
| 16 | $Co_{87}Cr_3Zr_{10}$ | 420 |
| 17 | $Co_{85}Al_5Zr_{10}$ | 350 |
| 18 | $Co_{65}Ti_5Mo_{30}$ | 240 |

In the above example, a case has been described wherein a main phase of a magnetic thin film is amorphous, and a boundary phase is amorphous or crystalline. However, the main phase of the magnetic thin film may be crystalline, and the boundary phase may be crystalline. Such an example will be explained below. A pair of magnetic thin films each consisting of a crystalline alloy having a composition of $Fe_{50}Ni_{50}$ (so-called Parmalloy) and having a width of 10 mm and a thickness of 15 µm are formed by plating on two portions of the surface of a shaft formed of a ferromagnetic material (S45C) and having a diameter of 20 mm. A YAG laser is used, and an operation of scanning a laser beam having a spot size of 100 µm at a rate of 1 m/min is repeated at a 1-mm pitch in the same manner as described above. As a result, crystalline boundary phases 14 having magnetic characteristics different from those of crystalline main phases 13 are formed, and these boundary phases 14 are aligned in a stripe manner. The main phases are stable crystalline phases, and the boundary phases are metastable crystalline phases. The laser beam radiation direction corresponds to a direction of an easy axis of magnetization. Uniaxial magnetic anisotropy $K^1_{UO}$ is introduced into the magnetic thin film 12a in a +45° direction and uniaxial magnetic anisotropy $K^2_{UO}$ is introduced to the magnetic thin film 12b in a −45° direction, both with respect to the circumferential direction of the shaft 11.

Figure 10:
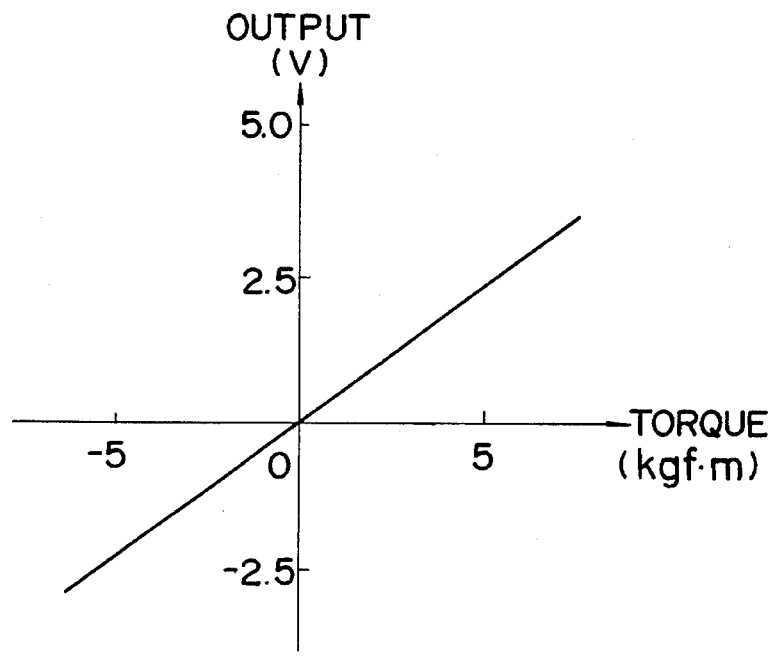
FIG. 10 is a graph showing a torque detection characteristic of a torque sensor prepared using still another magnetic material in Example 1 of the present invention.
Figure 11:
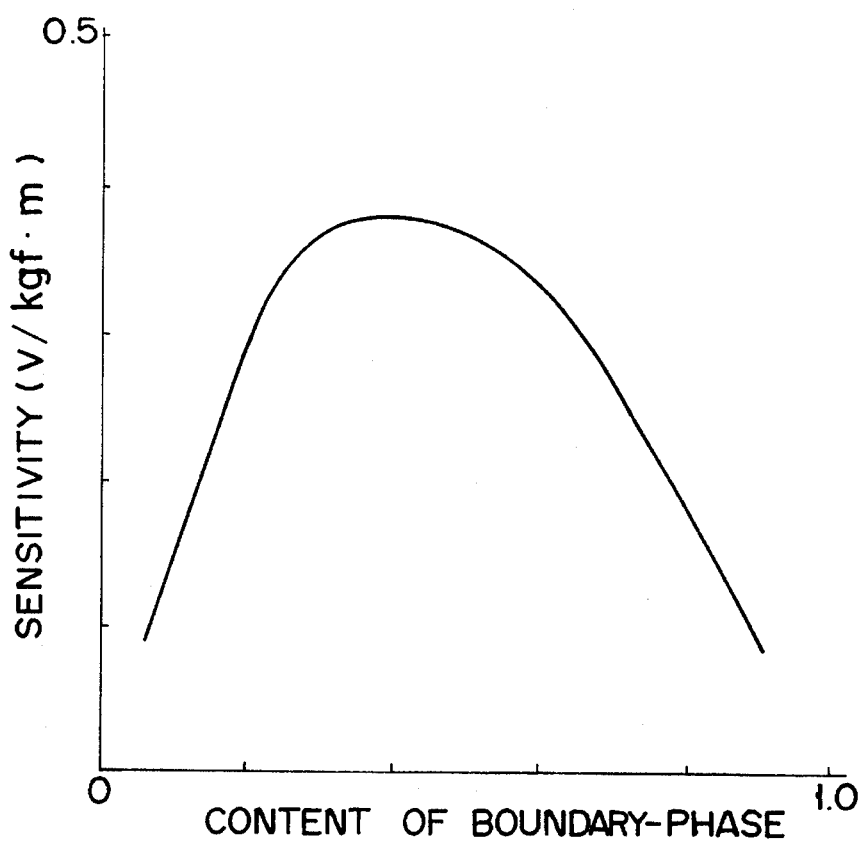
FIG. 11 is a graph showing the relationship between a content of boundary phases and a sensitivity of the torque sensor prepared using still another magnetic material in Example 1 of the present invention.

A torque sensor as in FIG. 4 is prepared, and its torque detection result is shown in FIG. 10. As can be seen from FIG. 10, the output of this torque sensor can exhibit good linearity over a wide torque range. FIG. 11 shows an examination result of the relationship between a content of crystalline boundary phases in the magnetic thin film and a sensitivity. As shown in FIG. 11, a poor sensitivity is obtained when the content of the crystalline boundary phases is near 0 or 1, and there is an optimal content to obtain a good sensitivity. The content of the crystalline boundary phases in the magnetic thin film can be changed by changing, e.g., a radiation pitch of a laser beam.

Crystalline boundary phases may be formed by radiating a laser beam on a shaft itself formed of a crystalline magnetic material. Such an example will be explained below. A YAG laser is used, and an operation of scanning a laser beam having a spot size of 100 μm at a rate of 1 m/min is repeated at a 1-mm pitch on the surface of the shaft 11 formed of a ferromagnetic material (S45C) and having a diameter of 20 mm in the same manner as described above. As a result, crystalline boundary phases 14 having magnetic characteristics different from those of the crystalline main phases 13 constituting the shaft 11 itself are formed, and these boundary phases are aligned in a stripe manner. The main phases are stable crystalline phases, and the boundary phases are metastable crystalline phases. The laser beam scanning direction corresponds to a direction of an easy axis of magnetization. As shown in FIG. 12 uniaxial magnetic anisotropy $K^1_{UO}$ is introduced into the region 12a in a +45° direction and uniaxial magnetic anisotropy $K^2_{UO}$ is introduced into the region 12b in a −45° direction, both with respect to the circumferential direction of the shaft 11.

A torque sensor as in FIG. 12 is prepared and its torque detection result is shown in FIG. 13. As can be seen from FIG. 13, this torque sensor can exhibit good linearity over a wide torque range although its output is not so large.

EXAMPLE 2

A method of introducing magnetic anisotropy by locally heating a magnetic ribbon will be described below.

An amorphous alloy ribbon having the following composition and a magnetostriction constant of about $10^{-5}$ is prepared by a quenching roll method:

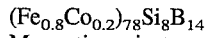

Magnetic anisotropy is introduced into this magnetic ribbon using an apparatus shown in FIG. 14. Referring to FIG. 14, a guide base 102 is placed on a table 101. A magnetic ribbon 12 is taken up from a supply roll by a takeup roll (neither are shown), and travels above the guide base 102. Support columns 103 are mounted on the table 101. A ball screw 104 is rotatably mounted on the support columns 103, and a guide rail 105 is fixed to the columns 103. An optical system 106 is coupled to the ball screw 104, and is moved along the guide rail 105. The optical system 106 includes a mirror 107 and a lens 108. Movement of the magnetic ribbon 12 is detected by a movement detector 110 through a sensor 109. Movement of the optical system 106 is controlled by controlling a servo motor 111 for rotating the ball screw 104 by a servo motor controller 112. A laser beam 114 emitted from a YAG laser 113 is reflected by the mirror 107, is focused by the lens 108, and is then radiated onto the magnetic ribbon 12. In this case, in order to prevent degradation of the magnetic ribbon 12 caused by oxidation, an Ar gas is supplied from a gas supplier 115 to the interior of the optical system 106. The above-mentioned members are controlled by a controller 116 according to setup on a control board 117. Note that reference numeral 55 in FIG. 14 denotes an electromagnet used in Example 4, which is not used in this example.

In this case, an operation for continuously scanning a laser beam having a spot size of 100 μm on the magnetic ribbon 12 at a scanning rate of 3 m/min is repeated along a predetermined direction at a 1-mm pitch. As a result, amorphous boundary phases having magnetic characteristics different from those of main phases are formed, and are aligned in a stripe manner.

FIG. 15 is a photograph showing magnetic domain configuration which is obtained by applying a magnetic field in a direction perpendicular to a scanning direction of the laser beam (extending direction of a boundary phase) and then returning the magnetic field near 0, and which is observed by a magnetic domain observation apparatus utilizing a longitudinal Kerr effect. As shown in FIG. 15, magnetic domain configuration similar to the model shown in FIG. 3 can be formed.

The magnetic ribbon in which magnetic anisotropy is introduced in this manner is bonded to a shaft, thereby preparing the same torque sensor as in FIG. 4.

EXAMPLE 3

Another method of introducing magnetic anisotropy by locally heating a magnetic ribbon will be described below.

As shown in FIG. 16, a magnetic ribbon 12 is movably supported between supply and takeup rolls (neither are shown). Infrared rays directly emitted from an infrared lamp 122 connected to a power source 121 and infrared rays 124 reflected by a focusing mirror 123 are radiated onto the magnetic ribbon 12 through a slit 126 formed in a slit plate 125.

In this case, when the infrared lamp 122 is repetitively turned on and off while moving the magnetic ribbon 12, boundary phases aligned in a stripe manner can be formed.

As shown in FIG. 17, a shutter 127 having a slit 128 is movably supported on one surface of the slit plate 125. The infrared rays 124 pass through overlapping portions of the slit 126 of the slit plate 125 and the slit 128 of the shutter 127, and are radiated onto the magnetic ribbon 12 in a spot. The spot of the infrared rays 124 is scanned upon movement of the magnetic ribbon 12 and movement of the shutter 127.

EXAMPLE 4

A method of introducing magnetic anisotropy by locally heating a magnetic material in a magnetic field will be described below. This method is conducted using apparatus basically similar to those in Examples 1 to 3.

A target having a special shape is set in an RF magnetron sputtering apparatus. Then a pair of magnetic thin films each formed of an amorphous alloy having the following composition and having a width of 10 mm and a thickness of 15 μm are formed on two portions of the surface of a shaft formed of a ferromagnetic material (S45C) and having a diameter of 20 mm:

Magnetic anisotropy is introduced into these magnetic thin films using an apparatus which comprises an electromagnet 55 in addition to the arrangement shown in FIG. 2, as shown in FIG. 18. A laser beam 52 emitted from a laser 51 is reflected by a mirror 53, is focused by a lens 54, and is radiated on magnetic thin film 12a (or 12b) on the surface of a shaft 11 while a DC magnetic field is applied from the electromagnet 55 to the magnetic thin film 12a (or 12b), and the shaft 11 is rotated and moved in its longitudinal direction.

In this case, the spot size of the laser beam is set to be 50 µm, and the laser beam is continuously radiated at a scanning rate of 5 m/min. The laser beam scanning direction is set to be a +45° direction for the magnetic film 12a and to be a −45° direction for the magnetic film 12b, both with respect to the circumferential direction of the shaft 11. The above operation is repeated at a 1-mm pitch. The direction of the magnetic field generated by the electromagnet 55 is the same as these directions. As a result, amorphous boundary phases 14 having magnetic characteristics different from those of amorphous main phases 13 are formed, and are aligned in a stripe manner.

A torque sensor as in FIG. 4 is prepared, and its torque detection result is shown in FIG. 19. As can be seen from FIG. 19, the output of this torque sensor can exhibit good linearity over a wide torque range.

Another method of introducing magnetic anisotropy by locally heating a magnetic material in a magnetic field will be described below.

As shown in FIG. 14 described above, the electromagnet 55 may be arranged near the magnetic ribbon 12, and a laser beam may be scanned while a magnetic field is applied to the magnetic ribbon 12 along a predetermined direction, thereby introducing magnetic anisotropy.

Figure 20:
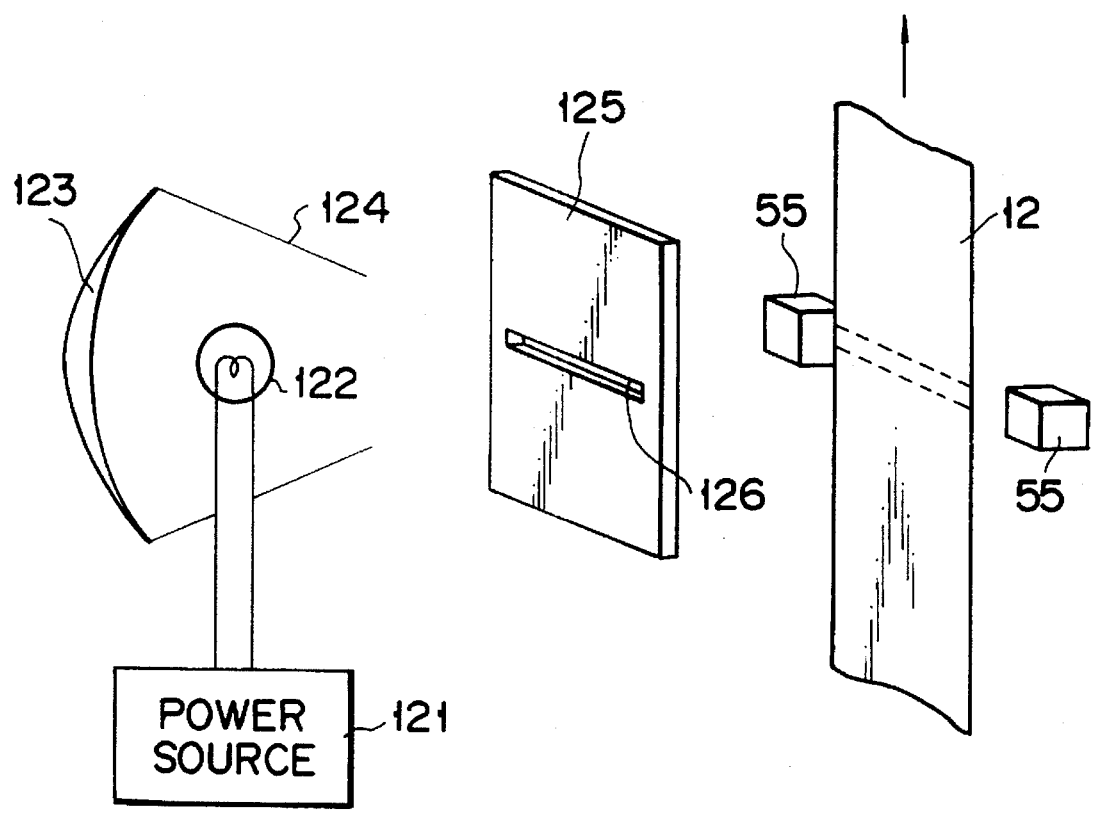
FIG. 20 is a diagram showing another apparatus used for introducing magnetic anisotropy into a magnetic ribbon in Example 4 of the present invention.

As shown in FIG. 20, an apparatus which comprises the electromagnet 55 in addition to the arrangement shown in FIG. 16 is used, and infrared rays may be radiated through a slit 126 while a magnetic field is applied to the magnetic ribbon 12 along a predetermined direction, thereby introducing magnetic anisotropy.

EXAMPLE 5

A method of introducing magnetic anisotropy by locally heating a magnetic ribbon while a stress is applied to the magnetic ribbon will be described below.

An amorphous alloy ribbon having the following composition and a magnetostriction constant of about $10^{-5}$ is prepared by a quenching roll method:

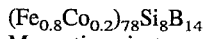

$(Fe_{0.8}Co_{0.2})_{78}Si_8B_{14}$

Magnetic anisotropy is introduced into the magnetic ribbon using an apparatus shown in FIG. 21. Referring to FIG. 21, the magnetic ribbon 12 is movably supported by a supply roller 132, double rollers 133 and 134 for fixing the magnetic ribbon, and a takeup roller (not shown), which are arranged above a stage 131 movable in the X-Y direction. Loads 135 are attached to support members of the double rollers 134, and a tensile stress is applied to the magnetic ribbon 12 fixed between the double rollers 133 and 134. A laser beam is radiated from a laser 51 onto the magnetic ribbon 12. Note that the stage 131 may be rotatable.

While a tensile stress of 10 kg/mm² is applied to the magnetic ribbon 12 by the loads 135, a laser beam having a spot size of 50 µm is continuously scanned in a predetermined direction upon movement of the stage 131. This operation is repeated at a 1-mm pitch. As a result, not only an internal stress introduced by local heating but also a stress by loads are applied to the magnetic ribbon, thus introducing stress induced magnetic anisotropy into the magnetic ribbon 12.

Figure 22:
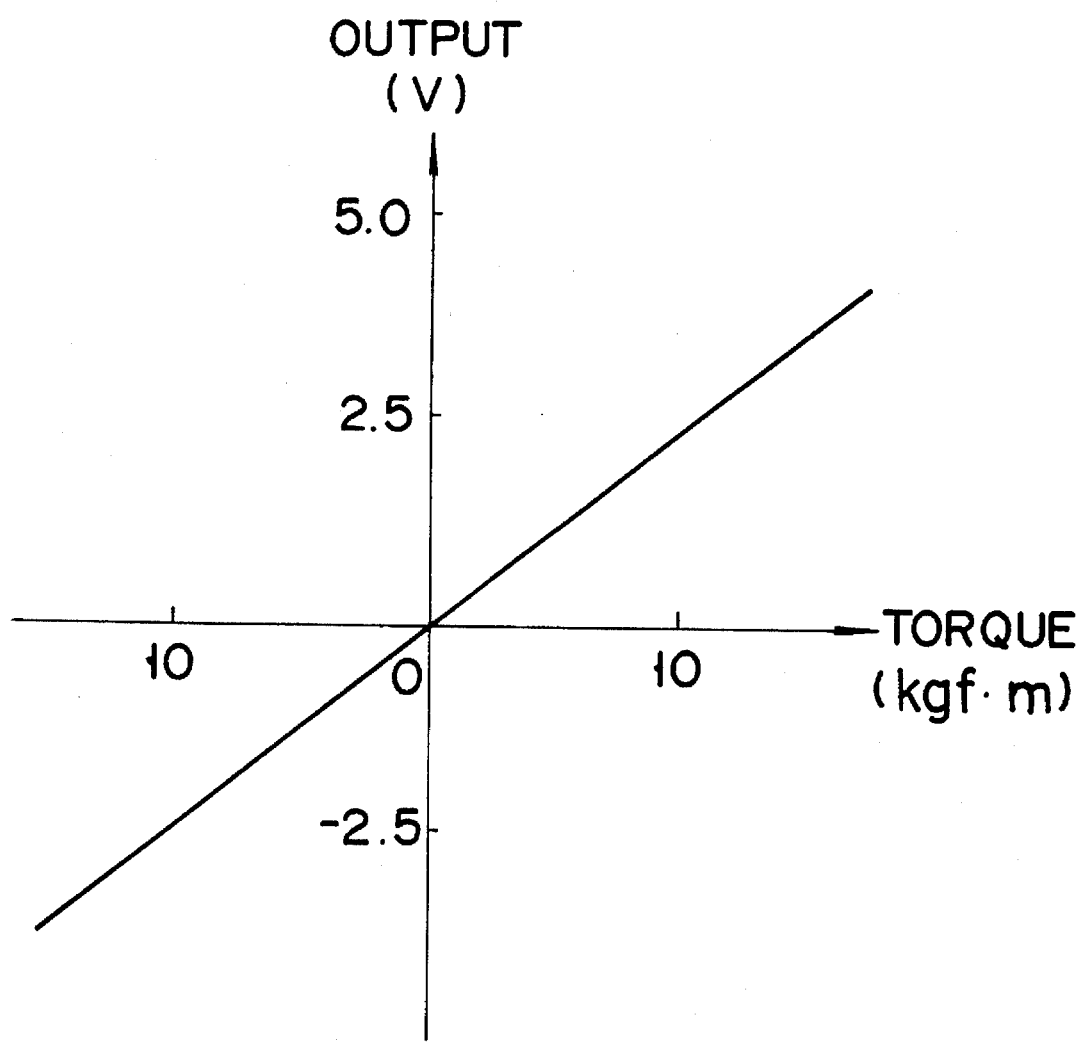
FIG. 22 is a graph showing a torque detection characteristic of a torque sensor prepared in Example 5 of the present invention.

Magnetic ribbons in which magnetic anisotropy is introduced in a predetermined direction in this manner are bonded to a shaft, thereby preparing the same torque sensor as in FIG. 4. FIG. 22 shows a torque detection result of this torque sensor. As can be seen from FIG. 22, the output of this torque sensor can exhibit good linearity over a wide torque range.

Another method of introducing magnetic anisotropy by locally heating a magnetic ribbon while a stress is applied to the magnetic ribbon will be described below.

As shown in FIG. 23, four sides of the magnetic ribbon 12 may be mechanically pressed by a fixing jig 136 on the stage 131 which is movable in the X-Y direction, and a laser beam may be radiated from the laser 51 onto the magnetic ribbon 12 through an opening 137 formed in the fixing jig 136, with this method, when a region irradiated with the laser beam is melted and solidified, a stress is consequently applied to the magnetic ribbon 12, thus introducing stress-induced magnetic anisotropy.

In the apparatus shown in FIG. 14, 16, or 17, of the two rollers (not shown) for supporting the magnetic ribbon 12, the takeup roller may be set to be rotated relatively faster, thereby applying a tensile stress to the magnetic ribbon. In this case, the roller is preferably slidable in a roller axial direction.

As a modification, as shown in FIG. 21 or 23, an electromagnet 55 may be arranged, so that both a stress and a magnetic field may be applied to the magnetic ribbon 12. In this method, magnetic anisotropy induced by local heating and the magnetic field and stress-induced magnetic anisotropy are synthesized, and complex magnetic anisotropy can be introduced. Note that the direction of the magnetic field is preferably set to define an arbitrary angle with respect to the direction of a stress.

EXAMPLE 6

A method of introducing magnetic anisotropy by locally heating a magnetic material in an atmosphere in which a compound of the magnetic material is produced will be described below.

A target having a special shape is set in an RF magnetron sputtering apparatus. Then a pair of magnetic thin films each formed of an amorphous alloy having the following composition and having a width of 10 mm and a thickness of 15 µm are formed on two portions of the surface of a shaft formed of a ferromagnetic material (S45C) and having a diameter of 20 mm:

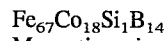

$Fe_{67}Co_{18}Si_1B_{14}$

Figure 24:
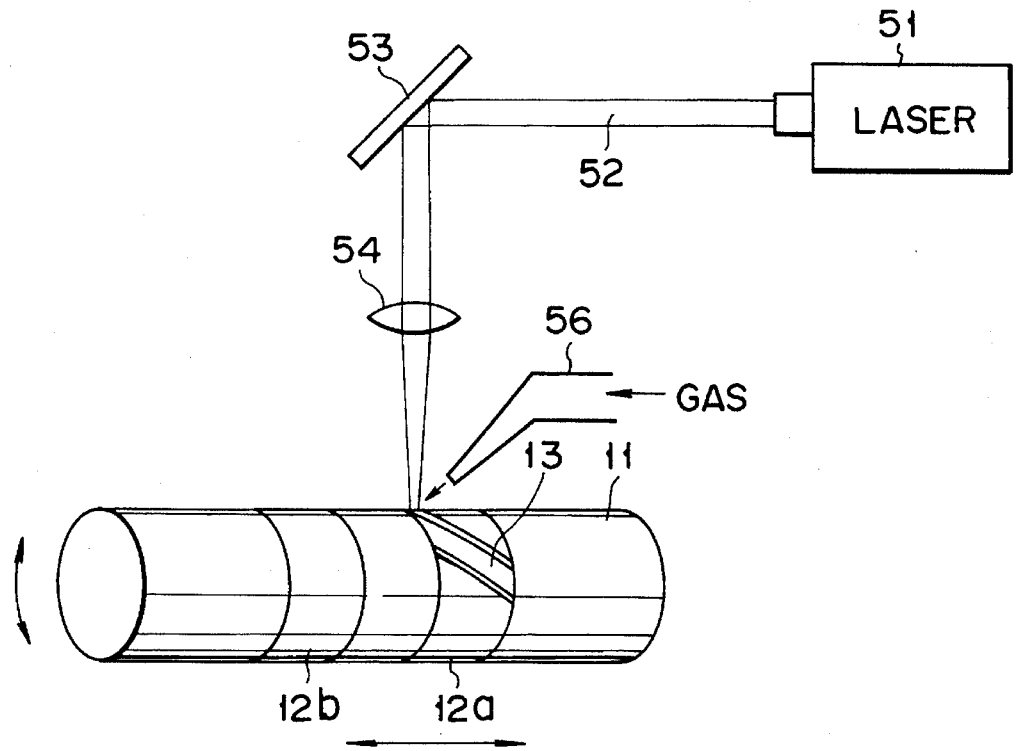
FIG. 24 is a diagram showing an apparatus used for introducing magnetic anisotropy into a magnetic thin film in Example 6 of the present invention.

Magnetic anisotropy is introduced into these magnetic thin films using an apparatus which comprises a nozzle 56 for blowing an oxygen gas in addition to the arrangement shown in FIG. 2, as shown in FIG. 24. A laser beam 52 emitted from a laser 51 is reflected by a mirror 53, is focused by a lens 54, and is then radiated on magnetic thin film 12a (or 12b) on the surface of a shaft 11 while an oxygen gas having a purity of 95% is blown from the nozzle 56, and the shaft 11 is rotated and moved in its longitudinal direction. In this case, a laser beam having a spot size of 100 µm is continuously radiated at a scanning rate of 1 m/min. The laser beam scanning direction is set to be a +45° direction for the magnetic thin film 12a and to be a −45° direction for the magnetic thin film 12b, both with respect to the circumferential direction of the shaft 11. The above operation is repeated at a 1-mm pitch. As a result, boundary phases 14 containing oxides are formed in regions irradiated with the laser beam, and are aligned in a stripe manner. The oxides include melted and solidified amorphous phases having a composition of Fe—Co—Si—B—O, and polycrystalline phases consisting of microcrystals such as $Fe_2O_3$, $Fe_3O_4$, CoO, and the like. The laser beam radiation direction corresponds to a direction of an easy axis of magnetization. Uniaxial magnetic anisotropy $K^1_{UO}$ is introduced into the magnetic thin film 12a in a +45° direction, and uniaxial magnetic anisotropy $K^2_{UO}$ introduced into the magnetic thin film 12b in a −45° direction, both with respect to the circumferential direction of the shaft 11.

Figure 25:
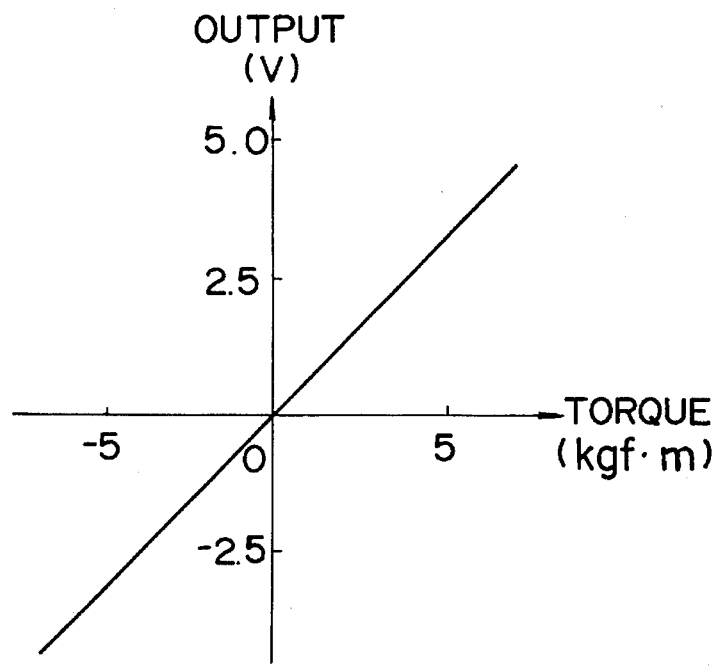
FIG. 25 is a graph showing a torque detection characteristic of a torque sensor prepared in Example 6 of the present invention.

A torque sensor having the same structure as in FIG. 4 is prepared, and its torque detection result is shown in FIG. 25. As can be seen from FIG. 25, the output of this torque sensor can exhibit good linearity over a wide torque range.

A method of introducing magnetic anisotropy by locally heating a magnetic material in another atmosphere will be described below.

Magnetic anisotropy is introduced into magnetic thin films in the same manner as described above, except that $Fe_{50}Ni_{50}$ is formed by plating in place of the above-mentioned amorphous alloy, and a nitrogen gas having a purity of 95% is used in place of an oxygen gas. In this case, boundary phases containing nitrides are formed. The nitrides include melted and solidified amorphous phases having a composition of Fe—Ni—N and polycrystalline phases consisting of microcrystals such as FeN.

As described above, according to the method of the present invention, sufficient magnetic anisotropy can be easily and reliably introduced into magnetic thin films. As a result, a torque sensor having a high sensitivity can be prepared.

A torque sensor may have the following arrangement in addition to those described above.

The torque sensor shown in FIG. 4 employs the excitation coil 16. As shown in FIG. 26, an excitation coil may be omitted, and torque detection may be performed by a circuit arrangement shown in FIG. 27. In FIG. 27, a sine wave current generated by an oscillator 21 is amplified by an amplifier 22. The output terminal of the amplifier 22 is connected to a bridge circuit consisting of a series circuit of a detection coil 15a and a resistor $R_1$ 17a, and a series circuit of a detection coil 15b and a resistor $R_2$ ($R_2=R_1$) 17b. The sine wave current generated by the oscillator 21 is input to a reference signal generator 27, and a signal generated by the generator 27 is output to a phase detector 28. The detection terminal of the bridge circuit is connected to a differential amplifier 25. The output from the differential amplifier is detected by the phase detector 28, thereby obtaining an output according to a torque.

As shown in FIG. 28, a magnetic head 18a (18b) around which a detection coil 15a (15b) and an excitation coil 16a (16b) are wound may be used, and torque detection may be performed by a circuit arrangement shown in FIG. 29. In FIG. 29, the detection coils 15a and 15b are differentially connected.

A magnetic material in which magnetic anisotropy is introduced by the method of the present invention can be applied to a strain sensor, a current sensor, and the like in addition to the torque sensor.

A strain sensor will be described below with reference to FIG. 30. In FIG. 30, magnetic ribbons 12 having a magnetostriction effect are arranged on the two surfaces of a coil substrate 31 to be insulated therefrom. Uniaxial magnetic anisotropy is introduced into the magnetic ribbons 12 to have easy axes of magnetization along their longitudinal direction by the method of the present invention. The coil substrate 31 is prepared by arranging a pair of coils 33a and 33b on one surface of a flexible insulating substrate 32 along the longitudinal direction of the substrate 32, and connecting the coils 33a and 33b in series with each other between terminals 34a and 34b. The inner ends of the coils 33a and 33b are connected by a wiring 35 arranged on the lower surface side of the substrate 32 via through holes. The outer end of one coil 33a is connected to the terminal 34a via a wiring 36a, and the outer end of the other coil 33b is connected to the terminal 34b via a wiring 36b. As a result, currents in opposite directions flow through the coils 33a and 33b, and the coils 33a and 33b generate magnetic fluxes in opposite directions.

When a current flows between the terminals 34a and 34b, the magnetic fluxes generated by the coils 33a and 33b pass through magnetic paths extending along the longitudinal direction of the magnetic ribbons 12. When a tensile stress or compression stress acts in the longitudinal direction of the magnetic ribbons 12, induced magnetic anisotropy appears by the magnetostriction effect, and as a result, magnetic permeability is changed. Since the change in permeability appears as a change in synthesized inductance of the coils 33a and 33b, the magnitude of a strain can be detected.

A current sensor will be described below with reference to FIG. 31. In FIG. 31, a magnetic thin film 12 in which uniaxial magnetic anisotropy is introduced in a predetermined direction by the method of the present invention is formed on the surface of a columnar core 41. A coil 42 through which a current to be detected flows and a detection coil 43 are wound near the magnetic thin film 12.

when a current flows through the coil 42, magnetic characteristics of the magnetic thin film 12 are changed. Since the impedance of the detection coil 43 is changed according to the change in magnetic characteristics, the magnitude of the current flowing through the coil 42 can be detected.

A magnetic material in which magnetic anisotropy is introduced by the method of the present invention can be applied not only to various sensors but also to a magnetic core, and the like. For example, when linear boundary phases are formed in the widthwise direction of an elongated magnetic ribbon, and are patterned in its longitudinal direction, magnetic domains can be segmented, thus reducing hysteresis when a troidal core is prepared by winding this magntic ribbon, this can realize a low-loss. In this case, if a magnetic ribbon has a composition exhibiting low magnetostriction or zero magnetostriction, it can realize a still lower loss, and can be used up to a high-frequency range.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A method of introducing magnetic anisotropy into a magnetic material, comprising:

providing an energy beam having a spot size;

scanning said energy beam in a scanning direction at a scanning rate and scanning pitch thereby to selectively and locally heat a surface of said magnetic material to form a pattern of boundary phases for magnetically dividing a main phase of said magnetic material into a plurality of regions to impart magnetic anisotropy to the divided main phase regions in a direction perpendicular to the scanning direction.

2. A method according to claim 1, wherein the energy beam is radiated on a magnetic thin film formed on a surface of a base member.

3. A method according to claim 1, wherein the energy beam is radiated onto a magnetic ribbon.

4. A method according to claim 1, wherein the energy beam is an energy beam selected from the group consisting of a laser beam, an infrared beam, an electron beam, and an ion beam.

5. A method according to claim 1, wherein the main phase is amorphous, and the boundary phase is crystalline.

6. A method according to claim 1, wherein the main phase is crystalline, and the boundary phase is crystalline.

7. A method according to claim 1, further comprising:

applying a magnetic field to said magnetic material.

8. A method according to claim 1, further comprising:

applying a stress to said magnetic material.

9. A method according to claim 1, further comprising:

applying a magnetic field and a stress to said magnetic material.

10. A method according to claim 1, further comprising:

locally heating said magnetic material in an oxidizing atmosphere.

11. A method according to claim 1, further comprising:

locally heating said magnetic material in a nitrogen atmosphere.

12. A method according to claim 1, further comprising:

using an oxide as said magnetic material, and locally heating said magnetic material in a reducing atmosphere.

13. A method according to claim 1, wherein a width of each boundary phase falls within a range of 1 μm to 1 mm.

14. A method according to claim 13, wherein the width of each boundary phase falls within a range of 1 μm to 100 μm.

15. A method according to claim 1, wherein an interval between adjacent boundary phases falls within a range of 50 μm to 10 mm.

16. A method of introducing magnetic anisotropy into a magnetic material, comprising:

providing an energy beam having a spot size;

scanning said energy beam in a scanning direction at a scanning rate and scanning pitch thereby to selectively and locally heat a surface of said magnetic material to form a pattern of boundary phases for magnetically dividing a main phase of said magnetic material into a plurality of regions to impart magnetic anisotropy to the divided main phase regions in a direction perpendicular to the scanning direction, each of said magnetic material, boundary phases and main phase being amorphous.

17. A method of introducing magnetic anisotropy into a magnetic material, comprising:

providing an energy beam having a spot size;

scanning said energy beam in a scanning direction at a scanning rate and scanning pitch thereby to selectively and locally heat a surface of said magnetic material to form a pattern of boundary phases apart from each other by 200 μm to 2 mm for magnetically dividing a main phase of said magnetic material into a plurality of regions to impart magnetic anisotropy to the divided main phase regions in a direction perpendicular to the scanning direction.

* * * * *